US012729949B2

(12) United States Patent
Kawata et al.

(10) Patent No.: US 12,729,949 B2
(45) Date of Patent: Sep. 8, 2026

(54) THREE-DIMENSIONAL SHAPE MEASURING DEVICE, REFERENCE SURFACE POSITION ADJUSTMENT METHOD THEREFOR, AND MEASUREMENT MODE SWITCHING METHOD THEREFOR

(71) Applicant: Tokyo Seimitsu Co., Ltd., Tokyo (JP)

(72) Inventors: Yoshiyuki Kawata, Tsuchiura-city (JP); Katsufumi Moriyama, Tsuchiura-city (JP); Hideki Morii, Tsuchiura-city (JP)

(73) Assignee: TOKYO SEIMITSU CO., LTD., Tokyo (JP)

( * ) Notice: Subject to any disclaimer, the term of this patent is extended or adjusted under 35 U.S.C. 154(b) by 42 days.

(21) Appl. No.: 18/795,599

(22) Filed: Aug. 6, 2024

(65) Prior Publication Data

US 2024/0393097 A1 Nov. 28, 2024

Related U.S. Application Data

(63) Continuation of application No. PCT/JP2023/003194, filed on Feb. 1, 2023.

(30) Foreign Application Priority Data

Feb. 7, 2022 (JP) ............................. JP2022-017249
Feb. 7, 2022 (JP) ............................. JP2022-017250
(Continued)

(51) Int. Cl.
*G01B 9/02055* (2022.01)
*G01B 11/24* (2006.01)

(52) U.S. Cl.
CPC ...... *G01B 9/02067* (2013.01); *G01B 11/2441* (2013.01)

(58) Field of Classification Search
CPC ............ G01B 9/02067; G01B 11/2441; G01B 9/0209; G01B 9/02055; G01B 11/24
(Continued)

(56) References Cited

U.S. PATENT DOCUMENTS

2007/0211256 A1* 9/2007 Medower ............. G01B 9/0209 356/491
2010/0128278 A1 5/2010 Deck et al.
(Continued)

FOREIGN PATENT DOCUMENTS

CN 102147240 A 8/2011
CN 103697806 A 4/2014
(Continued)

OTHER PUBLICATIONS

"Geometrical product specifications (GPS)—Surface texture: Areal—Part 600: Metrological characteristics for areal topography measuring methods," International Standard, ISO 25178-606, First edition, Feb. 2019, 11 pages total.
(Continued)

*Primary Examiner* — Md M Rahman
(74) *Attorney, Agent, or Firm* — Birch, Stewart, Kolasch & Birch, LLP

(57) ABSTRACT

A three-dimensional shape measuring device includes a holder that changes the reference light path length in response to temperature change, and a temperature adjusting unit that adjusts a temperature of the holder to a target temperature, so as to make a measurement light path length equal to a reference light path length with high accuracy at low cost regardless of a temperature of an installation environment. A three-dimensional shape measuring device includes a temperature adjusting unit that adjusts the temperature of the holder and a temperature control unit that controls the temperature adjusting unit so as to selectively
(Continued)

switch a measurement mode between a first measurement mode in which the reference light path length is made equal to a measurement light path length and a second measurement mode in which the reference light path length is made different from the measurement light path length.

9 Claims, 23 Drawing Sheets

(30) Foreign Application Priority Data

Jan. 18, 2023 (JP) ............................ JP2023-006106
Jan. 18, 2023 (JP) ............................ JP2023-006109

(58) Field of Classification Search
USPC .......................................................... 356/496
See application file for complete search history.

(56) References Cited

U.S. PATENT DOCUMENTS

| | | | | |
|---|---|---|---|---|
| 2010/0259765 | A1* | 10/2010 | Lee | G01B 9/0203 356/601 |
| 2011/0020956 | A1* | 1/2011 | Nemoto | G01B 11/24 356/612 |
| 2011/0144505 | A1* | 6/2011 | Yamamoto | G01B 11/24 356/369 |
| 2013/0010286 | A1 | 1/2013 | Zhao et al. | |
| 2019/0204065 | A1 | 7/2019 | Akagawa et al. | |

FOREIGN PATENT DOCUMENTS

| | | | |
|---|---|---|---|
| JP | 2006-329807 | A | 12/2006 |
| JP | 2009-204502 | A | 9/2009 |
| JP | 2013-24748 | A | 2/2013 |
| JP | 2014-2026 | A | 1/2014 |
| JP | 2018-146497 | A | 9/2018 |
| JP | 2018-173338 | A | 11/2018 |
| JP | 2020-204528 | A | 12/2020 |
| JP | 6953673 | B2 | 10/2021 |
| TW | I425188 | B | 2/2014 |

OTHER PUBLICATIONS

"Geometrical product specifications (GPS)—Surface texture: Areal—Part 604: Nominal characteristics of non-contact (coherence scanning interferometry) instruments," International Standard, ISO 25178-604, First edition, Aug. 1, 2013, 13 pages total.

English translation of the International Search Report (Form PCT/ISA/210) for International Application No. PCT/JP2023/003194, dated Apr. 4, 2023.

International Preliminary Report on Patentability and English translation of the Written Opinion of the International Searching Authority (Forms PCT/IB/373 and PCT/ISA/237) for International Application No. PCT/JP2023/003194, dated Aug. 6, 2024.

Taiwanese Office Action and Search Report for Taiwanese Application No. 112104124, dated May 29, 2026, with English translation of the Office Action.

Indian Exmination Report and Search Report for counterpart Indian Application No. 20244706112, dated Jun. 23, 2026, with English translation.

* cited by examiner 9
17
16
36
12
DRIVE MECHANISM
10
30
28
24d
24d2
24c
25
20
24
24d1
26
D2
L2
34
32
L1
L3
22
24a
L1,L3
24b
D1
W
14
Z
X
Y

XIIIA

500

506

501

502

504

L1,L3

L1

L2

D1

D2

W

XIIIB

500

506

501

502

504

L1,L3

L1

L2

D1

D2

W

RELATED ART

RELATED ART

RELATED ART

THREE-DIMENSIONAL SHAPE MEASURING DEVICE, REFERENCE SURFACE POSITION ADJUSTMENT METHOD THEREFOR, AND MEASUREMENT MODE SWITCHING METHOD THEREFOR

CROSS-REFERENCE TO RELATED APPLICATIONS

The present application is a Continuation of PCT International Application No. PCT/JP2023/003194 filed on Feb. 1, 2023 claiming priorities under 35 U.S.C § 119(a) to Japanese Patent Application No. 2022-017249 filed on Feb. 7, 2022, Japanese Patent Application No. 2022-017250 filed on Feb. 7, 2022, Japanese Patent Application No. 2023-006106 filed on Jan. 18, 2023 and Japanese Patent Application No. 2023-006109 filed on Jan. 18, 2023. Each of the above applications is hereby expressly incorporated by reference, in their entirety, into the present application.

BACKGROUND OF THE INVENTION

Field of the Invention

The present invention relates to a three-dimensional shape measuring device that measures a three-dimensional shape of a surface to be measured, a three-dimensional shape measuring device reference surface position adjustment method, and a three-dimensional shape measuring device measurement mode switching method.

Description of the Related Art

There has been known a method of optically measuring a three-dimensional shape such as an all-in-focus image, a surface shape and a surface roughness shape of a surface to be measured of a measurement object, using a three-dimensional shape measuring device employing a white light interferometry (WLI) system described in Non-Patent Literature 1 and Patent Literature 1, a focus variation (FV) system described in Non-Patent Literature 2, or the like.

The three-dimensional shape measuring device employing the WLI system includes a white light interferometry microscope including a light source, an interfering unit, an objective lens and a camera, a drive mechanism, a camera, and a control device. The light source emits white light toward the interfering unit. The interfering unit separates part of the white light emitted from the light source as reference light, emits the remaining white light to a surface to be measured and emits the reference light to a reference surface. Further, the interfering unit emits interference light of the white light reflected by the surface to be measured and the reference light reflected by the reference surface toward the camera.

The objective lens is focused on the surface to be measured through publicly known focusing control so as to cause the white light to focus on the surface to be measured, before the white light is split by the interfering unit (for example, Michelson type) or after the white light is split (for example, Linic type). The drive mechanism causes the interfering unit or the white light interferometry microscope to scan along a scanning direction (vertical direction). The camera continuously captures images of the interference light emitted from the interfering unit to acquire a plurality of images including interference fringes while scanning of the interfering unit and the like, by the drive mechanism. The control device compares luminance values for each pixel on the same coordinate in the respective images and calculates height information of the surface to be measured for each pixel, to measure a three-dimensional shape of the surface to be measured.

The three-dimensional measuring device employing the FV system includes a drive mechanism, a camera and a control device. The drive mechanism causes the camera to scan along a scanning direction. While causing the camera to scan by the drive mechanism, the camera continuously captures images of a surface to be measured to acquire a plurality of images. The control device measures calculates focus degree for each pixel on the same coordinate in the respective images and detects change of the focus degree for each pixel, to measure a three-dimensional shape of the surface to be measured.

CITATION LIST

Patent Literature 1: Japanese Patent Application Laid-Open No. 2018-173338

Non-Patent Literature 1: ISO 25178-604:2013 "Geometrical product specifications (GPS)—Surface texture: Areal-Part 604: Nominal characteristics of non-contact (coherence scanning interferometry) instruments"

Non-Patent Literature 2: ISO25178-606:2019 "Geometrical product specifications (GPS)—Surface texture: Areal-Part 600: Metrological characteristics for areal topography measuring methods"

SUMMARY OF THE INVENTION

FIG. 13 to FIG. 15 are explanatory diagrams for describing problems of a white light interferometry microscope constituting a three-dimensional shape measuring device in related art. Here, description will be provided using an example of a Michelson-type white light interferometry microscope.

As indicated with reference characters XIIIA in FIG. 13, at least an interference objective lens 500, an interfering unit 501, a reference surface 502 and an objective lens 504 of the white light interferometry microscope are contained in a holder 506 formed of a metal material such as, for example, brass. Further, in measurement of a three-dimensional shape of a surface to be measured W, the objective lens 504 is focused on the surface to be measured W, and a reference light path length D2 that is an optical path length of reference light L2 between the interfering unit 501 and the reference surface 502 is made equal to a measurement light path length D1 that is an optical path length of measurement light L1 between the interfering unit 501 and the surface to be measured W. By this means, interference fringes are generated in interference light L3 to be emitted from the interference objective lens 500, so that it is possible to measure the three-dimensional shape of the surface to be measured W.

In this event, the holder 506 formed of brass, or the like, reversibly thermally deforms (expands, shrinks) in accordance with change in a temperature of an installation environment. Thus, as indicated with reference characters XIIIB in FIG. 13 and reference characters XIVA in FIG. 14, for example, if the holder 506 thermally expands, the reference light path length D2 changes, and the measurement light path length D1 becomes unequal to the reference light path length D2. As a result, generation of interference fringes in the interference light L3 is suppressed, which makes it difficult to measure the three-dimensional shape of the surface to be measured W.

Thus, as indicated with reference characters XIVB in FIG. 14, it is conceivable to change a distance between the holder 506 (interference objective lens 500) and the surface to be measured W, that is, the measurement light path length D1, in order to make the measurement light path length D1 equal to the reference light path length D2 that has changed due to thermal expansion of the holder 506. However, if the measurement light path length D1 is changed, the objective lens 504 is out of focus from the surface to be measured W. If the three-dimensional shape of the surface to be measured W is measured in this state, as illustrated in FIG. 15, a measured shape (see reference characters XVB) collapses with respect to an actual shape (see reference characters XVA) of the surface to be measured W, and measurement accuracy degrades. Further, intensity of interference light to be incident on the camera decreases, which makes it impossible to measure the three-dimensional shape of the surface to be measured W or degrades measurement accuracy.

Thus, a reference surface position adjustment mechanism with which a position of the reference surface 502 may be manually adjusted is provided to the holder 506. Then, an operator operates the reference surface position adjustment mechanism depending on temperature of an installation environment of the white light interferometry microscope to manually adjust the position of the reference surface 502 so that the reference light path length D2 becomes equal to the measurement light path length D1. This lowers accuracy of the position of the reference surface 502, adjustment resolution and reproducibility, and thus further inhibits promotion of efficiency (automation) of measurement of the three-dimensional shape of the surface to be measured W.

Further, it is necessary to prepare a highly accurate reference surface position adjustment mechanism to adjust the position of the reference surface 502 by the reference surface position adjustment mechanism so that the reference light path length D2 becomes equal to the measurement light path length D1. For example, assuming that a numerical aperture (NA) of the objective lens 504 is 0.7, and a wavelength of the measurement light L1 is 550 nm, a depth of field (DOF) of an objective lens 24*a* becomes "$DOF=\lambda/(2\times(NA)^2)=0.56\ \mu m$". In this case, the reference surface position adjustment mechanism requires to have control resolution sufficiently smaller than 0.56 μm, and thus, cost considerably increases.

The present invention has been made in view of such circumstances, and a first object is to provide a three-dimensional shape measuring device capable of making a measurement light path length equal to a reference light path length with high accuracy at low cost regardless of a temperature of an installation environment, and a reference surface position adjustment method of the three-dimensional shape measuring device.

Meanwhile, the WLI system has an advantage of having high vertical resolution of a surface to be measured and a disadvantage of requiring a long measurement period and being unsuitable for measurement of a three-dimensional shape of an inclined surface. Thus, the WLI system is suitable for measurement of a surface roughness shape of a surface to be measured. On the other hand, the FV system has an advantage of shortening a measurement period and being more suitable for measurement of a three-dimensional shape of an inclined surface than the white light interferometry system, and a disadvantage of having low vertical resolution of a surface to be measured. Thus, the FV system is suitable for measurement of a shape of a surface to be measured.

In this manner, the WLI system and the FV system have advantages and disadvantages that contradict each other, and thus, have a complementary relationship. It is therefore desirable to enable use of the WLI system and the FV system in accordance with a type of a surface to be measured, measurement content, and the like, in one three-dimensional shape measuring device.

In this event, an interference objective lens including, for example, an objective lens, a beam splitter, a reference surface (reference mirror), and the like, is required as an interfering unit to measure a three-dimensional shape of a surface to be measured using the WLI system. However, an image of the surface to be measured captured by a camera through the interference objective lens includes interference fringes. The interference fringes negatively affect calculation of the three-dimensional shape of the surface to be measured using the FV system. Thus, in a case where a common objective lens is used in the WLI system and the FV system, measurement accuracy of the three-dimensional shape of the surface to be measured using the FV system degrades. As a result of this, in the three-dimensional shape measuring device in related art, in a case where measurement is performed using the WLI system, the objective lens is switched to the interference objective lens, and in a case where measurement is performed using the FV system, the objective lens is switched to a normal objective lens.

Thus, in the three-dimensional shape measuring device in the related art, it is necessary to prepare a plurality of types of objective lenses, and it is also necessary to provide a mechanism for switching the objective lens, which increases cost. Further, measurement accuracy of the three-dimensional shape of the surface to be measured may degrade due to, for example, change in a correction value required for calculation of the three-dimensional shape of the surface to be measured as a result of attachment and removal of the objective lens.

The present invention has been made in view of such circumstances, and a second object of the present invention is to provide a three-dimensional shape measuring device capable of switching measurement between measurement of a three-dimensional shape of a surface to be measured using a WLI system and measurement of a three-dimensional shape of a surface to be measured using an FV system without replacing an objective lens, and a measurement mode switching method of the three-dimensional shape measuring device.

A three-dimensional shape measuring device to achieve the first object of the present invention includes: a light source unit configured to emit measurement light that is white light; an interfering unit configured to: separate as reference light, part of the measurement light emitted from the light source unit to emit the measurement light to a surface to be measured and emit the reference light to a reference surface; and generate interference light of the measurement light returning from the surface to be measured and the reference light returning from the reference surface; a holder configured to house the interfering unit and the reference surface, wherein the holder is formed of a material that reversibly thermally deforms in response to temperature change and causes a reference light path length which is an optical path length of the reference light between the interfering unit and the reference surface, to change in response to the temperature change; and a temperature adjusting unit configured to adjust, in a case where an optical path length of the measurement light between the interfering unit and the surface to be measured is set as a measurement light path length, a temperature of the holder to a target temperature at which the reference light path length becomes equal to the measurement light path length.

According to the three-dimensional shape measuring device, it is possible to make the reference light path length equal to the measurement light path length with high accuracy through adjustment of the temperature of the holder.

The three-dimensional shape measuring device according to another aspect of the present invention includes: a temperature measuring unit configured to measure the temperature of the holder; an objective lens configured to cause the measurement light to focus on the surface to be measured; a camera configured to capture an image of the interference light generated by the interfering unit; a temporary target temperature control unit configured to control the temperature adjusting unit to adjust the temperature of the holder to a temporary target temperature determined in advance; a focusing control unit configured to focus the objective lens on the surface to be measured; a reference surface position adjustment mechanism configured to accept manual adjustment of a position of the reference surface and makes the reference light path length roughly equal to the measurement light path length in a state where the temperature of the holder is adjusted to the temporary target temperature, and the objective lens is focused on the surface to be measured; a temperature change control unit configured to control the temperature adjusting unit to change the temperature of the holder in a state where the reference light path length is roughly equal to the measurement light path length; an image acquiring unit configured to cause the camera to repeatedly capture the image of the interference light to acquire images from the camera while the temperature change control unit changes the temperature of the holder; a temperature acquiring unit configured to acquire a temperature measurement result by the temperature measuring unit every time the camera captures the image of the interference light; and a target temperature determining unit configured to determine a temperature at which intensity of interference fringes becomes maximum as the target temperature based on the images acquired by the image acquiring unit and the temperature measurement result acquired by the temperature acquiring unit, for each of the images. Thus, it is possible to make the measurement light path length equal to the reference light path length with high accuracy at low cost.

The three-dimensional shape measuring device according to still another aspect of the present invention includes: a temperature measuring unit configured to measure the temperature of the holder; an objective lens configured to cause the measurement light to focus on the surface to be measured; a camera configured to capture an image of the interference light generated by the interfering unit; a focusing control unit configured to focus the objective lens on the surface to be measured; a temperature change control unit configured to control the temperature adjusting unit to change the temperature of the holder in a state where the objective lens is focused on the surface to be measured; an image acquiring unit configured to cause the camera to repeatedly capture the image of the interference light to acquire images from the camera while the temperature change control unit changes the temperature of the holder; a temperature acquiring unit configured to repeatedly acquire temperature measurement results by the temperature measuring unit while the temperature change control unit changes the temperature of the holder; and a target temperature determining unit configured to determine a temperature at which intensity of interference fringes becomes maximum as the target temperature based on the images acquired by the image acquiring unit and the temperature measurement results acquired by the temperature acquiring unit. This configuration enables to automate determination of the target temperature.

The three-dimensional shape measuring device according to yet another aspect of the present invention includes: a temperature measuring unit configured to measure the temperature of the holder; and a target temperature control unit configured to control the temperature adjusting unit to adjust the temperature of the holder to the target temperature based on the target temperature and a temperature measurement result of the temperature measuring unit. This configuration enables to accurately adjust and maintain the temperature of the holder to the target temperature.

In the three-dimensional shape measuring device according to another aspect of the present invention, the temperature adjusting unit changes a temperature of a reference surface housing part that houses the reference surface in the holder, and the temperature measuring unit measures the temperature of the reference surface housing part. This configuration enables to adjust the reference light path length through control of the temperature of the holder.

The three-dimensional shape measuring device according to still another aspect of the present invention includes a heat insulating material configured to cover at least the reference surface housing part, the temperature measuring unit and the temperature adjusting unit. This configuration enables to stabilize the temperatures of the reference surface housing part and the vicinity of the reference surface housing part.

The three-dimensional shape measuring device according to yet another aspect of the present invention includes: an adapter part to which one of a plurality of lens systems respectively including the holder, the temperature adjusting unit and the temperature measuring unit, is selectively attached; a target temperature storing unit configured to store a correspondence relationship between each of the plurality of lens systems and the target temperature determined for each of the lens systems; a lens system distinguishing unit configured to distinguish a lens system attached to the adapter part; and a target temperature acquiring unit configured to acquire the target temperature corresponding to the lens system attached to the adapter part from the target temperature storing unit based on a distinguishing result of the lens system distinguishing unit, and the target temperature control unit controls the temperature adjusting unit in accordance with the target temperature acquired by the target temperature acquiring unit. By this means, because the reference light path length may be reliably made equal to the measurement light path length while influence of an individual difference of the lens systems is suppressed, it is possible to measure the three-dimensional shape of the surface to be measured with higher accuracy.

The three-dimensional shape measuring device according to another aspect of the present invention includes: an objective lens configured to cause the measurement light to focus on the surface to be measured, wherein the interfering unit is positioned between the objective lens and the surface to be measured, and the reference surface is positioned between the objective lens and the interfering unit.

The three-dimensional shape measuring device according to still another aspect of the present invention includes: a camera configured to capture an image of the interference light generated by the interfering unit; a scanning unit configured to cause at least the interfering unit to scan in a scanning direction in which the measurement light path length changes relatively to the surface to be measured; and a shape calculating unit configured to calculate height information of the surface to be measured for each pixel to obtain the three-dimensional shape of the surface to be measured based on luminance values for each pixel on the same coordinate in images obtained by the camera repeatedly capturing images of the interference light during scanning by the scanning unit.

To achieve the first object of the present invention, a reference surface position adjustment method for a three-dimensional shape measuring device, includes: an interfering unit configured to separate as reference light, part of measurement light that is white light to emit the measurement light to a surface to be measured and emit the reference light to a reference surface; and generate interference light of the measurement light returning from the surface to be measured and the reference light returning from the reference surface; an objective lens configured to cause the measurement light to focus on the surface to be measured; and a holder configured to house the interfering unit and the reference surface, wherein the holder is formed of a material that reversibly thermally deforms in response to temperature change and causes a reference light path length which is an optical path length of the reference light between the interfering unit and the reference surface, to change in response to the temperature change, the reference surface position adjustment method including: a temporary target temperature adjusting step of adjusting a temperature of the holder to a temporary target temperature determined in advance; a focusing step of focusing the objective lens on the surface to be measured; a rough position adjusting step of manually adjusting a position of the reference surface to make the reference light path length roughly equal to a measurement light path length that is an optical path length of the measurement light between the interfering unit and the surface to be measured in a state where the temperature of the holder is adjusted to the temporary target temperature, and the objective lens is focused on the surface to be measured; a temperature changing step of changing the temperature of the holder after the rough position adjusting step, an imaging step of repeatedly capturing an image of the interference light while the temperature of the holder changes; a temperature acquiring step of acquiring the temperature of the holder every time the image of the interference light is captured in the imaging step; a target temperature determining step of determining a temperature at which intensity of interference fringes becomes maximum as a target temperature based on images obtained in the imaging step and the temperature of the holder for each of the images obtained in the temperature acquiring step; and a target temperature adjusting step of adjusting the temperature of the holder to the target temperature determined in the target temperature determining step.

To achieve the first object of the present invention, a reference surface position adjustment method for a three-dimensional shape measuring device, includes: an interfering unit configured to: separate as reference light, part of measurement light that is white light to emit the measurement light to a surface to be measured and to emit the reference light to a reference surface; and generate interference light of the measurement light returning from the surface to be measured and the reference light returning from the reference surface; an objective lens configured to cause the measurement light to focus on the surface to be measured; and a holder configured to house the interfering unit and the reference surface, wherein the holder is formed of a material that reversibly thermally deforms in response to temperature change and causes a reference light path length which is an optical path length of the reference light between the interfering unit and the reference surface, to change in response to the temperature change, the reference surface position adjustment method including: a focusing step of focusing the objective lens on the surface to be measured; a temperature changing step of changing a temperature of the holder after the focusing step; an imaging step of repeatedly capturing an image of the interference light while the temperature of the holder changes; a temperature acquiring step of acquiring the temperature of the holder every time the image of the interference light is captured in the imaging step; a target temperature determining step of determining a temperature at which intensity of interference fringes becomes maximum as a target temperature based on images obtained in the imaging step and the temperature of the holder for each of the images obtained in the temperature acquiring step; and a temperature adjusting step of adjusting the temperature of the holder to the target temperature determined in the target temperature determining step.

To achieve the second object of the present invention, a three-dimensional shape measuring device includes: a light source unit configured to emit measurement light that is white light; an interfering unit configured to: separate as reference light, part of the measurement light emitted from the light source unit to emit the measurement light to a surface to be measured and to emit the reference light to a reference surface; and generate multiplexed light of the measurement light returning from the surface to be measured and the reference light returning from the reference surface; a camera configured to capture an image of the multiplexed light generated by the interfering unit; a scanning unit configured to, in a case where an optical path length of the measurement light between the interfering unit and the surface to be measured is set as a measurement light path length, cause the interfering unit and the camera to scan in a scanning direction in which the measurement light path length changes relatively to the surface to be measured; a measurement control unit configured to cause the camera to repeatedly capture an image of the multiplexed light during scanning by the scanning unit; a holder configured to house the interfering unit and the reference surface, wherein the holder is formed of a material that reversibly thermally deforms in response to temperature change and causes a reference light path length which is an optical path length of the reference light between the interfering unit and the reference surface, to change in response to the temperature change; a temperature adjusting unit configured to adjust a temperature of the holder; and a temperature control unit configured to control the temperature adjusting unit so as to be able to selectively switch a measurement mode to either one of a first measurement mode in which the reference light path length is made to be equal to the measurement light path length to generate interference fringes in the multiplexed light, and a second measurement mode in which the reference light path length is made to be different from the measurement light path length to suppress generation of interference fringes in the multiplexed light.

According to the three-dimensional shape measuring device, it is possible to selectively switch the measurement mode between the first measurement mode and the second measurement mode through control of the temperature of the holder.

In the three-dimensional shape measuring device according to another aspect of the present invention, in a case where the temperature control unit switches the measurement mode to the first measurement mode, the camera repeatedly captures an image of the multiplexed light and outputs first images including the interference fringes during scanning by the scanning unit, and the three-dimensional shape measuring device comprises a first shape calculating unit configured to calculate height information of the surface to be measured for each pixel to obtain a three-dimensional shape of the surface to be measured based on luminance values for each pixel on the same coordinate in the first images output from the camera. By this means, it is possible to measure the three-dimensional shape of the surface to be measured using an optical interferometry system.

In the three-dimensional shape measuring device according to still another aspect of the present invention, in a case where the temperature control unit switches the measurement mode to the second measurement mode, the camera repeatedly captures an image of the multiplexed light and outputs second images in which generation of the interference fringes is suppressed during scanning by the scanning unit, and the three-dimensional shape measuring device comprises a second shape calculating unit configured to obtain a three-dimensional shape of the surface to be measured based on a result of calculating change of focus degree in the scanning direction for each pixel on the same coordinate in the second images output from the camera. By this means, it is possible to measure the three-dimensional shape of the surface to be measured using the FV system.

The three-dimensional shape measuring device according to yet another aspect of the present invention includes: a temperature measuring unit configured to measure a temperature of the holder, wherein the temperature control unit acquires in advance target temperatures including a first temperature that is a temperature corresponding to the first measurement mode and a second temperature that is the temperature corresponding to the second measurement mode, and the temperature control unit controls the temperature adjusting unit to switch the measurement mode between the first measurement mode and the second measurement mode based on a measurement result of the temperature measuring unit and the target temperatures. By this means, it is possible to selectively switch the measurement mode between the first measurement mode and the second measurement mode through control of the temperature of the holder.

In the three-dimensional shape measuring device according to another aspect of the present invention, the temperature adjusting unit changes a temperature of a reference surface housing part that houses the reference surface in the holder, and the temperature measuring unit measures the temperature of the reference surface housing part. By this means, it is possible to selectively switch the measurement mode between the first measurement mode and the second measurement mode through control of the temperature of the holder.

The three-dimensional shape measuring device according to still another aspect of the present invention includes a heat insulating material that covers at least the reference surface housing part, the temperature measuring unit and the temperature adjusting unit. This configuration may stabilize the temperatures of the reference surface housing part and the vicinity of the reference surface housing part.

In the three-dimensional shape measuring device according to yet another aspect of the present invention, the scanning unit causes at least the holder and the camera to move in the scanning direction. By this means, it is possible to cause the interfering unit and the camera to scan in the scanning direction relatively to the surface to be measured.

The three-dimensional shape measuring device according to another aspect of the present invention includes an objective lens configured to cause the measurement light to focus on the surface to be measured, wherein the interfering unit is positioned between the objective lens and the surface to be measured, and the reference surface is positioned between the objective lens and the interfering unit. By this means, even in a Mirau-type optical interferometer in which a shutter cannot be inserted into an optical path of reference light, it is possible to selectively switch the measurement mode between the first measurement mode and the second measurement mode only through control of the temperature of the holder.

To achieve the second object of the present invention, a measurement mode switching method for a three-dimensional shape measuring device, includes: a light source unit configured to emit measurement light that is white light; an interfering unit configured to: separate as reference light, part of the measurement light emitted from the light source unit to emit the measurement light to a surface to be measured and to emit the reference light to a reference surface; and generate multiplexed light of the measurement light returning from the surface to be measured and the reference light returning from the reference surface; a camera configured to capture an image of the multiplexed light generated by the interfering unit; a scanning unit configured to, in a case where an optical path length of the measurement light between the interfering unit and the surface to be measured is set as a measurement light path length, cause the interfering unit and the camera to scan in a scanning direction in which the measurement light path length changes relatively to the surface to be measured; and a holder configured to house the interfering unit and the reference surface, wherein the holder is formed of a material that reversibly thermally deforms in response to temperature change and causes a reference light path length which is an optical path length of the reference light between the interfering unit and the reference surface, to change in response to the temperature change, and the measurement mode switching method including adjusting the temperature of the holder to selectively switch a measurement mode between a first measurement mode in which the reference light path length is made to be equal to the measurement light path length to generate interference fringes in the multiplexed light, and a second measurement mode in which the reference light path length is made to be different from the measurement light path length to suppress generation of the interference fringes in the multiplexed light.

According to the three-dimensional shape measuring device and the reference surface position adjustment method of the three-dimensional shape measuring device, for achieving the first object of the present invention, it is possible to make the measurement light path length equal to the reference light path length with high accuracy at low cost regardless of a temperature of an installation environment. Further, according to the three-dimensional shape measuring device and the measurement mode switching method for the three-dimensional shape measuring device for achieving the second object of the present invention, it is possible to switch measurement mode between the three-dimensional shape measurement of the surface to be measured using the WLI system and the three-dimensional shape measurement of the surface to be measured using the FV system, without replacing the objective lens.

DESCRIPTION OF THE EMBODIMENTS

First Embodiment

Figure 1:
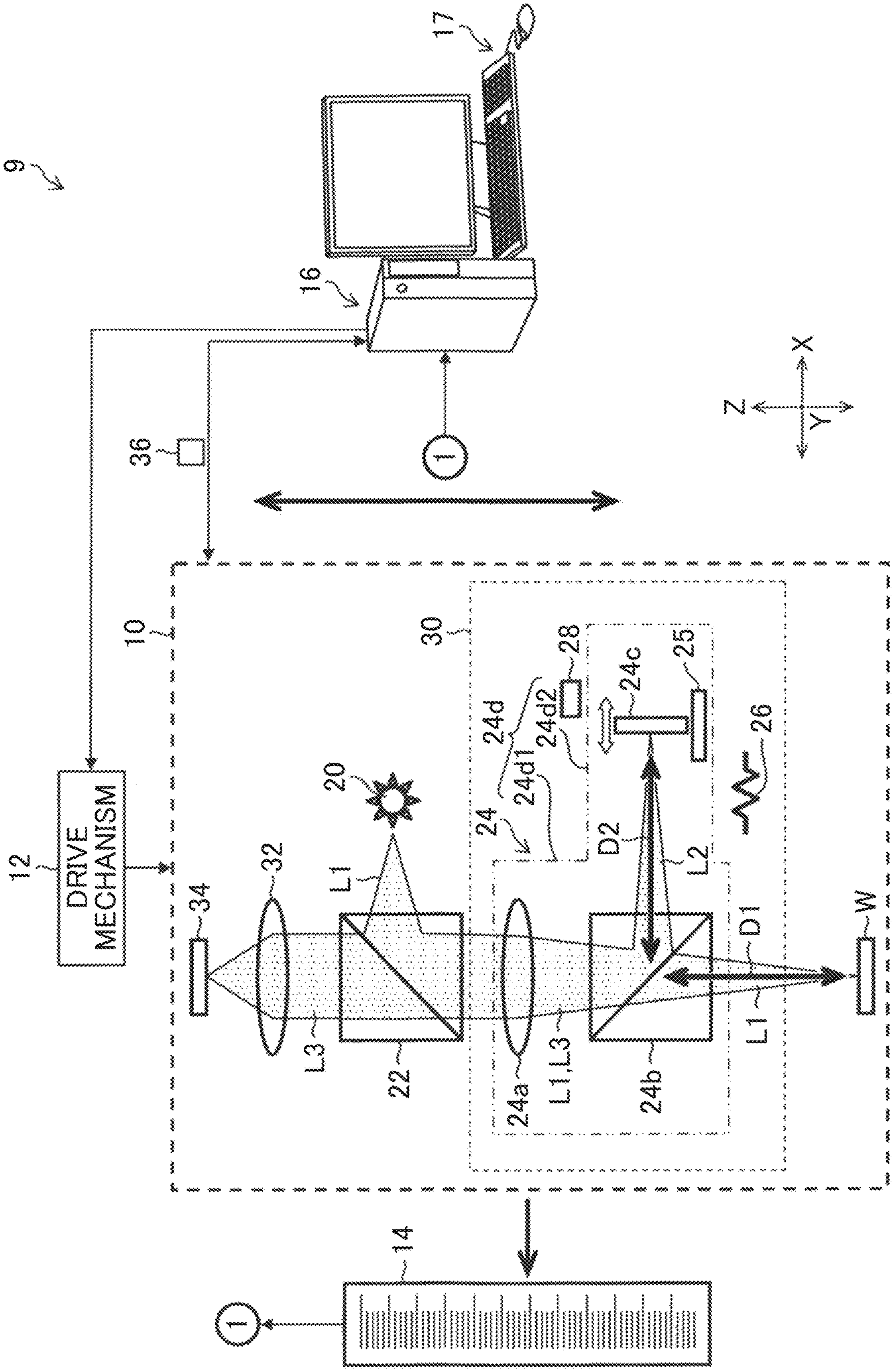
FIG. 1 is a schematic view of a three-dimensional shape measuring device according to a first embodiment.

FIG. 1 is a schematic view of a three-dimensional shape measuring device 9 of a first embodiment. Note that, among X, Y and Z directions perpendicular to each other in the drawing, X and Y directions are directions parallel to a horizontal direction, and the Z direction is a direction parallel to a vertical direction.

As illustrated in FIG. 1, the three-dimensional shape measuring device 9 measures a three-dimensional shape of a surface to be measured W using a WLI system. The three-dimensional shape measuring device 9 roughly includes a white light interferometry microscope 10, a drive mechanism 12, a scale 14, a control device 16 and an operating unit 17.

The white light interferometry microscope 10 is a Michelson-type scanning white light interferometry microscope. The white light interferometry microscope 10 includes a light source unit 20, a beam splitter 22, an interference objective lens 24, a temperature adjusting unit 26, a temperature sensor 28, a heat insulating material 30, an imaging lens 32, and a camera 34. The interference objective lens 24, the beam splitter 22, the imaging lens 32, and the camera 34 are arranged in this order from the surface to be measured W toward the upper side along the Z direction. Further, the light source unit 20 is arranged at a position facing the beam splitter 22 in the X direction (or can be the Y direction).

The light source unit 20 emits white light (low-coherence light with low coherence) of a parallel light flux toward the beam splitter 22 as measurement light L1 under control of the control device 16. While not illustrated, the light source unit 20 includes a light source capable of emitting the measurement light L1, such as a light-emitting diode, a semiconductor laser, a halogen lamp and a high-brightness discharge lamp, and a contact lens that converts the measurement light L1 emitted from the light source into a parallel light flux.

As the beam splitter 22, for example, a half mirror is used. The beam splitter 22 reflects part of the measurement light L1 incident from the light source unit 20 toward the interference objective lens 24 on a lower side in the Z direction. Further, the beam splitter 22 allows part of interference light L3, which will be described later, incident from the interference objective lens 24 to pass therethrough toward the upper side in the Z direction, so to emit the interference light L3 toward the imaging lens 32.

The interference objective lens 24 is a Michelson-type lens. The interference objective lens 24 includes an objective lens 24*a*, a beam splitter 24*b*, a reference surface 24*c*, and a holder 24*d*. The beam splitter 24*b* and the objective lens 24*a* are arranged in this order from the surface to be measured W toward the upper side along the Z direction. The reference surface 24*c* is arranged at a position facing the beam splitter 24*b* in the X direction (or can be the Y direction).

The objective lens 24*a* has a focusing function and causes the measurement light L1 incident from the beam splitter 22 to focus on the surface to be measured W through the beam splitter 24*b*. As the objective lens 24*a*, for example, a high-power objective lens for which NA is equal to or greater than 0.7, is used.

The beam splitter 24*b* corresponds to an interfering unit of the present invention. For example, a half mirror may be used as the beam splitter 24*b*. The beam splitter 24*b* splits part of the measurement light L1 incident from the objective lens 24*a* as reference light L2, and emits the reference light L2 toward the reference surface 24*c*. Further, the beam splitter 24*b* allows the other part of the measurement light L1 to pass therethrough, and emits the other part of the measurement light L1 toward the surface to be measured W. Note that a reference numeral D1 in the drawings indicates a measurement light path length that is an optical path length of the measurement light L1 between the beam splitter 24*b* and the surface to be measured W. The measurement light L1 that has passed through the beam splitter 24*b* is radiated on the surface to be measured W, then reflected by the surface to be measured W and returns to the beam splitter 24*b*.

As the reference surface 24*c*, for example, a reflecting mirror is used, and the reference surface 24*c* reflects the reference light L2 incident from the beam splitter 24*b* toward the beam splitter 24*b*. A position of the reference surface 24*c* in the X direction may be manually adjusted using a reference surface position adjustment mechanism 25.

The reference surface position adjustment mechanism 25 is, for example, a screw-type fine adjustment mechanism. The reference surface position adjustment mechanism 25 adjusts the position of the reference surface 24*c* in the X direction, according to operation by an operator. This enables adjustment of a reference light path length D2 that is an optical path length of the reference light L2 between the beam splitter 24*b* and the reference surface 24*c*. The reference surface position adjustment mechanism 25 is used to manually adjust (roughly adjust) the position of the reference surface 24*c* in the X direction so that the reference light path length D2 becomes roughly equal to the measurement light path length D1.

The beam splitter 24*b* generates the interference light L3 between the measurement light L1 returning from the surface to be measured W and the reference light L2 returning from the reference surface 24*c*, and emits the interference light L3 toward the objective lens 24*a* on the upper side in the Z direction. The interference light L3 passes through the objective lens 24*a* and the beam splitter 22, and is incident on the imaging lens 32. The interference light L3 is light including interference fringes 101 (see FIG. 4).

The holder 24*d* is formed of a metal material like, for example, brass, that is, a material that reversibly thermally deforms. The holder 24*d* includes a lens barrel 24*d*1 and a reference surface housing part 24*d*2. The lens barrel 24*dl* is formed in a cylindrical shape extending in the Z direction and contains (holds) the objective lens 24*a* and the beam splitter 24*b*. The reference surface housing part 24*d*2 is formed in a cylindrical shape extending in the X direction from a position at which the lens barrel 24*dl* holds the beam splitter 24*b*. The reference surface housing part 24*d*2 houses the reference surface 24*c* therein. Note that as described above, the position of the reference surface 24*c* in the X direction may be manually adjusted using the reference surface position adjustment mechanism 25.

The temperature adjusting unit 26 is provided in the vicinity of the reference surface housing part 24*d*2 and adjusts at least a temperature between the beam splitter 24*b* and the reference surface 24*c*, that is, a temperature of the reference surface housing part 24*d*2 under control of the control device 16 which will be described later. As the temperature adjusting unit 26, for example, a heater, a Peltier element, or the like, is used.

The reference surface housing part 24*d*2 is formed of brass as described above, and thus, reversibly thermally deforms (expands, shrinks) in response to temperature change. It is therefore possible to change the temperature of the reference surface housing part 24*d*2 by the temperature adjusting unit 26 so as to cause thermal deformation of the reference surface housing part 24*d*2, thereby adjusting the position of the reference surface 24*c* in the X direction in accordance with the thermal deformation of the reference surface housing part 24*d*2. Further, because the temperature of the reference surface housing part 24*d*2 is precisely controlled, it is possible to adjust the position of the reference surface 24*c* in the X direction with higher accuracy (higher resolution), that is, adjust the reference light path length D2 with higher accuracy than in a case where the reference surface position adjustment mechanism 25 is used. In the present embodiment, the position of the reference surface 24*c* in the X direction (reference light path length D2) is finely adjusted so that the reference light path length D2 becomes equal to the measurement light path length D1, with temperature adjustment of the reference surface housing part 24*d*2 which is performed by the temperature adjusting unit 26 under control of the control device 16.

The temperature sensor 28 corresponds to a temperature measuring unit of the present invention. The temperature sensor 28 is provided in the vicinity of the reference surface housing part 24*d*2. The temperature sensor 28 measures at least a temperature of the reference surface housing part 24*d*2 (between the beam splitter 24*b* and the reference surface 24*c*) in the holder 24*d*, and outputs the temperature measurement result to the control device 16. The measurement result of the temperature sensor 28 is utilized for control of the temperature adjusting unit 26 by the control device 16, that is, adjustment of the position of the reference surface 24*c* in the X direction (adjustment of the reference light path length D2).

The heat insulating material 30 is provided so as to cover the whole of the interference objective lens 24, the temperature adjusting unit 26 and the temperature sensor 28. This prevents a temperature inside the heat insulating material 30, particularly, the temperatures of the reference surface housing part 24*d*2 and the vicinity of the reference surface housing part 24*d*2 from changing by being affected by outside.

The imaging lens 32 forms an image of the interference light L3 incident from the beam splitter 22 on an imaging surface (not illustrated) of the camera 34. Specifically, the imaging lens 32 forms an image of a point on a focal plane of the objective lens 24*a* on the imaging surface of the camera 34 as an image point.

The camera 34 includes a charge coupled device (CCD)-type or a complementary metal oxide semiconductor (CMOS)-type imaging element (not illustrated). The camera 34 captures an image of the interference light L3 formed on the imaging surface of the imaging element by the imaging lens 32, performs signal processing on an imaging signal of the interference light L3 obtained by the imaging and outputs a captured image 36. The captured image 36 is an image including the interference fringes 101 (see FIG. 4).

The drive mechanism 12 corresponds to a scanning unit of the present invention. The drive mechanism 12 is constituted with various kinds of actuators such as a publicly known linear motor or a motor drive mechanism and holds the white light interferometry microscope 10 so as to be movable in the Z direction that is a scanning direction. The drive mechanism 12 causes the white light interferometry microscope 10 to scan along the Z direction under control of the control device 16. This enables change of the measurement light path length D1 upon measurement of the three-dimensional shape of the surface to be measured W.

Note that the drive mechanism 12 only requires to be able to cause the white light interferometry microscope 10 or at least the beam splitter 24*b* to scan in the Z direction relatively to the surface to be measured W. For example, the drive mechanism 12 may cause the white light interferometry microscope 10 or at least the beam splitter 24*b* to scan in the Z direction relatively to the surface to be measured W (support part that supports the surface to be measured W).

The scale 14 is a position detection sensor that detects a position of the white light interferometry microscope 10 in the Z direction. For example, a linear scale is used as the scale 14. The scale 14 repeatedly detects the position of the white light interferometry microscope 10 in the Z direction and repeatedly outputs the position detection result to the control device 16.

The control device 16 according to the first embodiment comprehensively controls adjustment of the position of the reference surface 24*c* in the X direction, operation of measuring the three-dimensional shape of the surface to be measured W by the white light interferometry microscope 10, calculation of the three-dimensional shape of the surface to be measured W, and the like, in accordance with input operation to the operating unit 17. The control device 16 includes an arithmetic circuit constituted with various kinds of processors, memories, and the like. The various kinds of processors include a central processing unit (CPU), a graphics processing unit (GPU), an application specific integrated circuit (ASIC), a programmable logic device (for example, a simple programmable logic device (SPLD), a complex programmable logic device (CPLD), and field programmable gate arrays (FPGA)), and the like. Note that various kinds of functions of the control device 16 may be implemented by one processor or may be implemented by a plurality of processors of the same type or different types.

Figure 2:
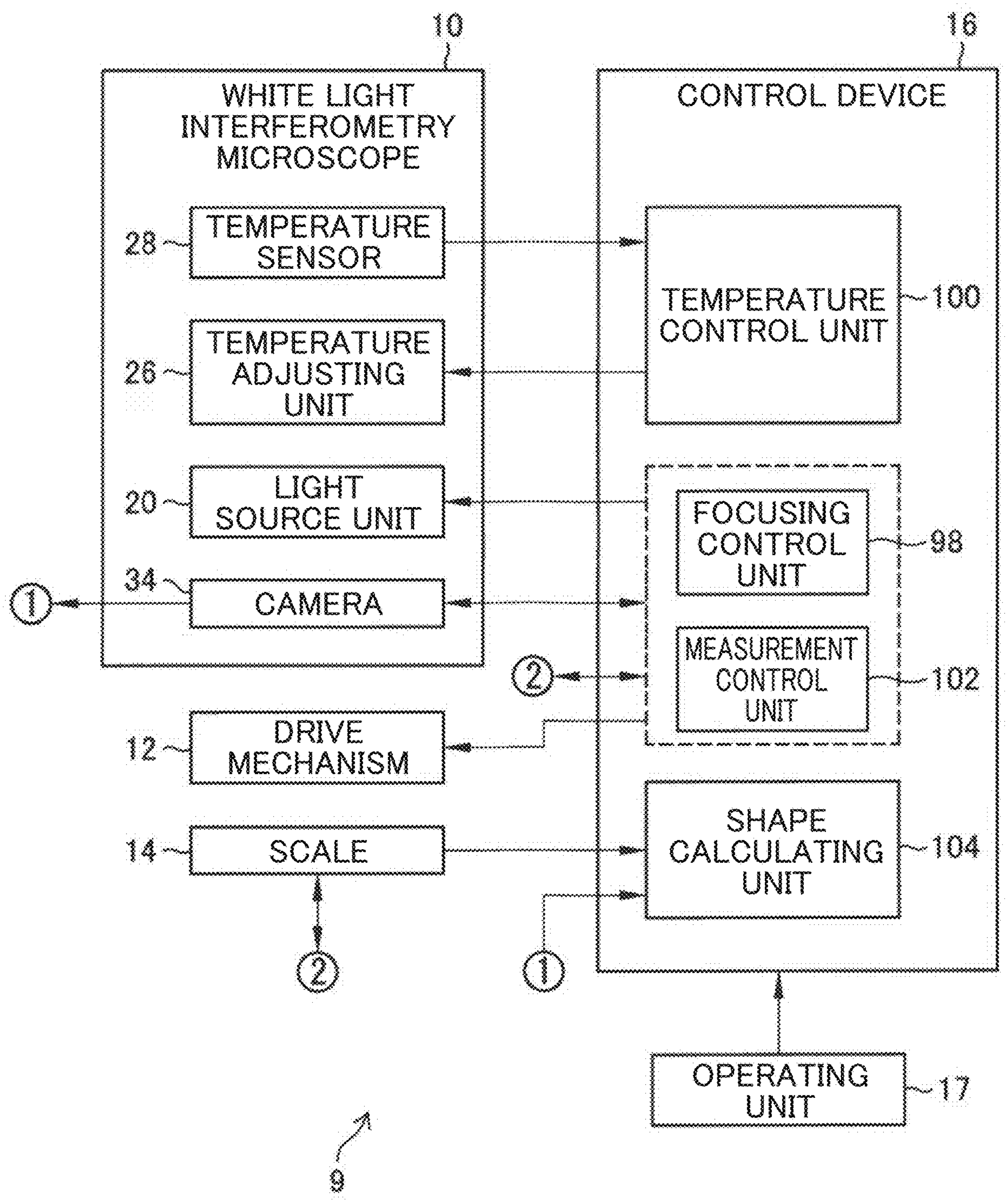
FIG. 2 is a functional block diagram of a control device.

FIG. 2 is a functional block diagram of the control device 16 according to the first embodiment. As illustrated in FIG. 2, respective units (the light source unit 20, the temperature adjusting unit 26, the temperature sensor 28 and the camera 34) of the white light interferometry microscope 10, the drive mechanism 12, the scale 14, and the operating unit 17 are connected to the control device 16.

The control device 16 functions as a focusing control unit 98, a temperature control unit 100, a measurement control unit 102 and a shape calculating unit 104 by executing a control program (not illustrated) read out of a storage unit (not illustrated).

The focusing control unit 98 performs focusing control of focusing the objective lens 24*a* on the surface to be measured W when adjusting the position of the reference surface 24*c* in the X direction (upon determination of a target temperature which will be described later) and when measuring the three-dimensional shape of the surface to be measured W.

For example, the focusing control unit 98 causes the light source unit 20 to emit the measurement light L1, causes the white light interferometry microscope 10 to scan in the Z direction by the drive mechanism 12, and causes the camera 34 to repeatedly capture the image of the interference light L3 and output the captured image 36 while the scanning is performed. Then, the focusing control unit 98 calculates focus degree (contrast value) for each pixel of each captured image 36 based on captured images 36 output from the camera 34 and determines a position of the white light interferometry microscope 10 in the Z direction at which the objective lens 24*a* is focused on the surface to be measured W based on the calculation result. Then, the focusing control unit 98 controls the drive mechanism 12 based on the determination result of the position of the white light interferometry microscope 10 in the Z direction to adjust the position of the white light interferometry microscope 10 in the Z direction, thereby focusing the objective lens 24*a* on the surface to be measured W.

Note that a focusing control method by the focusing control unit 98 is not limited to the above-described method, and various kinds of publicly known methods may be used. Further, in the present embodiment, a test pattern 99 for focusing control is formed on the surface to be measured W that is to be used for adjusting the position of the reference surface 24*c* in the X direction (see FIG. 4).

The temperature control unit 100 controls the temperature adjusting unit 26 to adjust the temperature of the reference surface housing part 24*d*2. This enables the temperature control unit 100 to adjust the position of the reference surface 24*c* in the X direction, that is, the reference light path length D2. As described above, the reference surface housing part 24*d*2 (holder 24*d*) is formed of a material that reversibly thermally deforms. As a result of the thermal deformation of the reference surface housing part 24*d*2 due to temperature of an installation environment of the white light interferometry microscope 10, the reference light path length D2 changes. Thus, inversely, the reference light path length D2 may be adjusted to a desired value by adjusting the temperature of the reference surface housing part 24*d*2.

Thus, in the present embodiment, a target temperature of the reference surface housing part 24*d*2 (holder 24*d*) is determined in advance such that the reference light path length D2 becomes equal to the measurement light path length D1 in a state where the objective lens 24*a* is focused on the surface to be measured W, and the temperature of the reference surface housing part 24*d*2 is adjusted to the target temperature. By this means, the position of the reference surface 24*c* in the X direction is adjusted so that the reference light path length D2 becomes equal to the measurement light path length D1.

Figure 3:
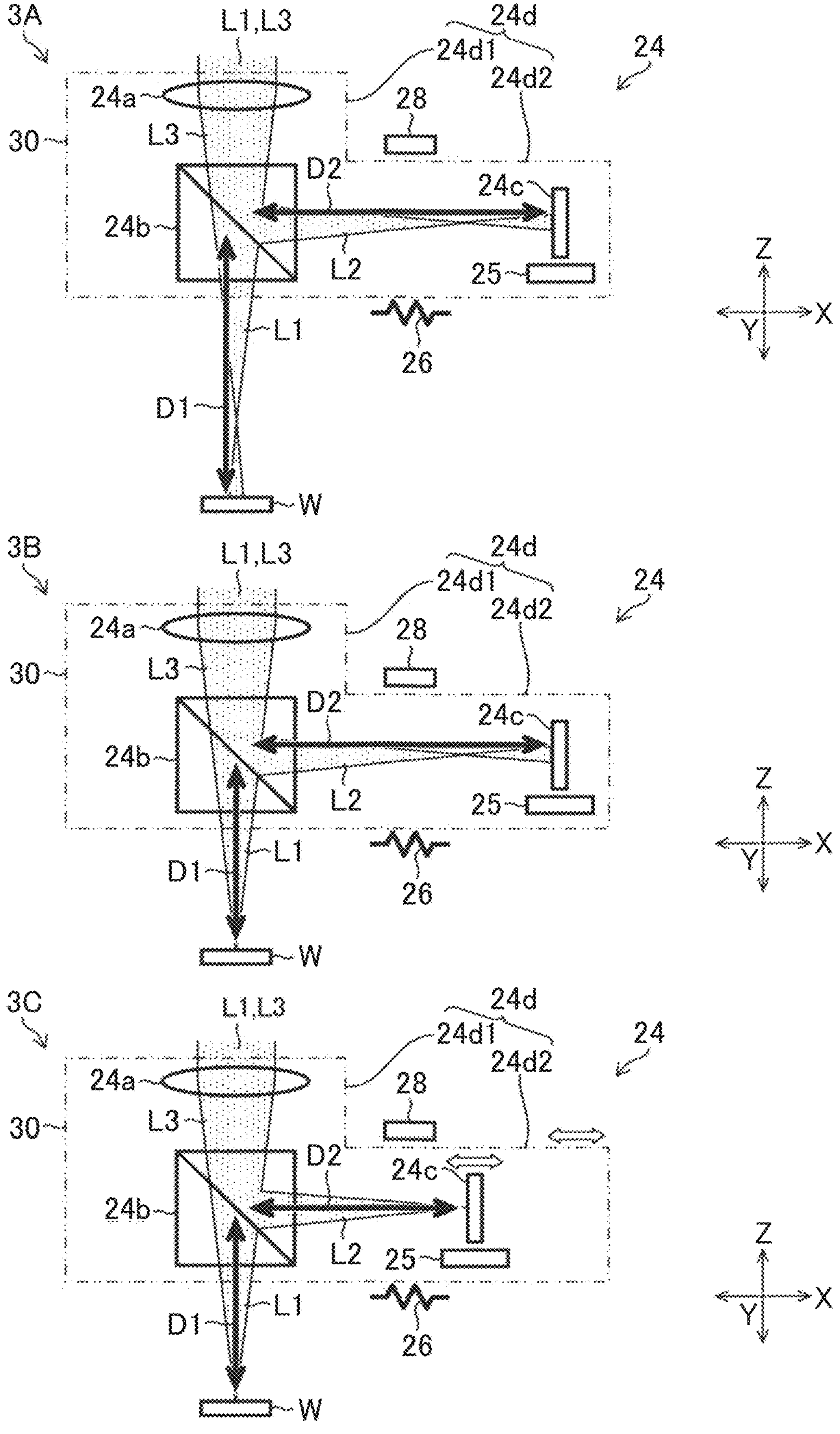
FIG. 3 is an explanatory diagram in which reference numerals 3A to 3C respectively describe flow of processing of determining a target temperature of a reference surface housing part.
Figure 4:
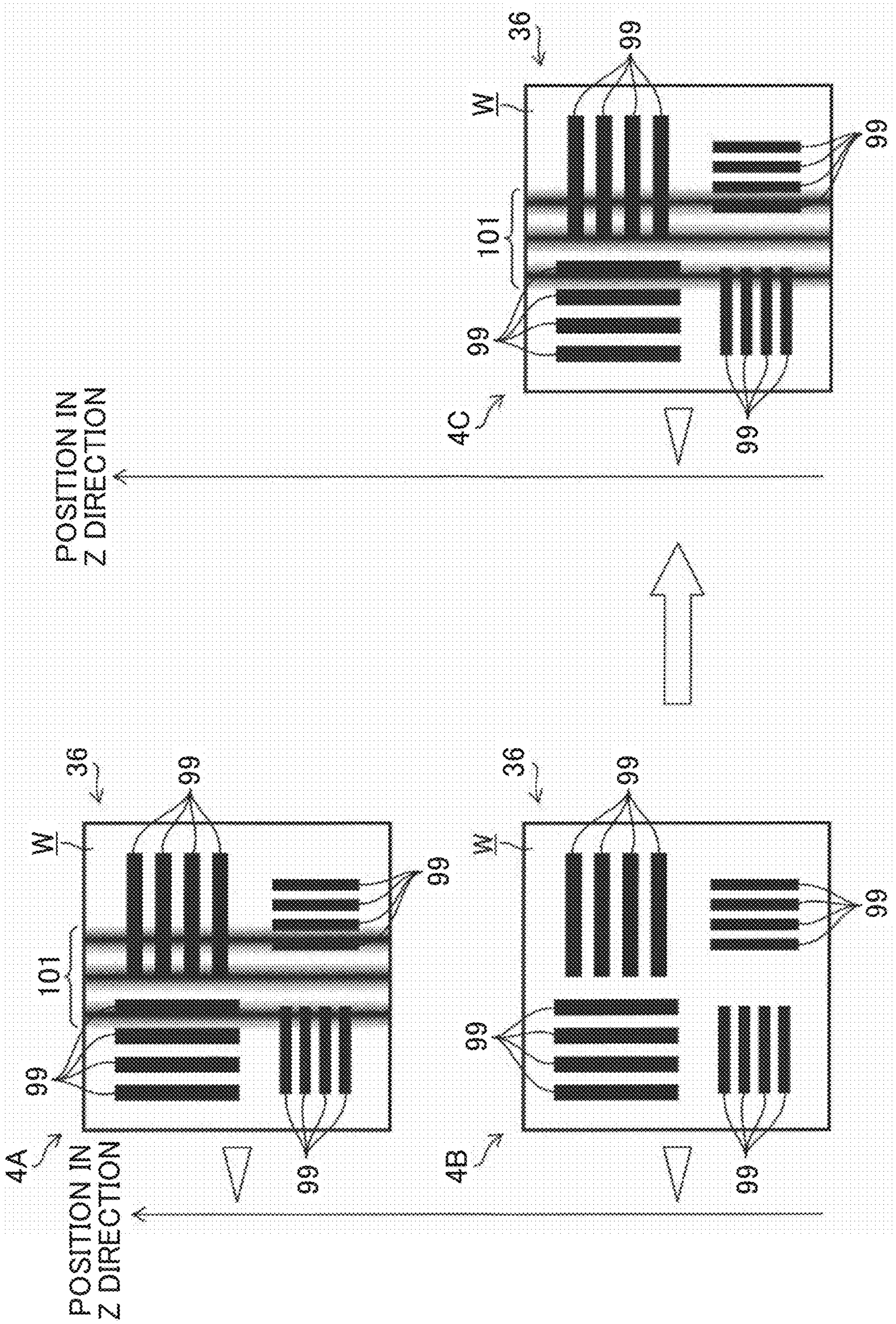
FIG. 4 illustrates captured images in which a reference numeral 4A is an image captured by a camera, corresponding to a state of the reference numeral 3A in FIG. 3, a reference numeral 4B is an image captured by a camera, corresponding to a state of the reference numeral 3B in FIG. 3, and a reference numeral 4C is an image captured by a camera, corresponding to a state of the reference numeral 3C in FIG. 3.

In FIG. 3, reference numerals 3A to 3C are explanatory diagrams for describing flow of processing of determining the target temperature of the reference surface housing part 24*d*2. In FIG. 4, a reference numeral 4A is the captured image 36 by the camera 34, corresponding to a state of the reference numeral 3A in FIG. 3, a reference numeral 4B is the captured image 36 by the camera 34, corresponding to a state of the reference numeral 3B in FIG. 3, and a reference numeral 4C is the captured image 36 by the camera 34, corresponding to a state of the reference numeral 3C in FIG. 3. Note that a vertical axis (ordinate) in FIG. 4 indicates a position of the white light interferometry microscope 10 in the Z direction when an image is captured by the camera 34.

The surface to be measured W on which the test pattern 99 is formed, is set in advance in the white light interferometry microscope 10. As indicated with the reference numeral 3A in FIG. 3 and the reference numeral 4A in FIG. 4, the temperature adjusting unit 26 is controlled by the temperature control unit 100 to adjust the temperature of the reference surface housing part 24*d*2 to a temporary target temperature determined in advance. In this case, the temperature control unit 100 functions as a temporary target temperature control unit of the present invention. The temporary target temperature is, for example, a recommended value of a temperature of an environment in which the interference objective lens 24 is used, determined by a manufacturer. In this state, an image of the test pattern 99 in the captured image 36 captured by the camera 34 is out of focus.

Then, as indicated with the reference numeral 3B in FIG. 3 and the reference numeral 4B in FIG. 4, the above-described focusing control unit 98 performs focusing control (adjustment of the position of the white light interferometry microscope 10 in the Z direction) to focus the objective lens 24*a* to the test pattern 99 on the surface to be measured W. While the image of the test pattern 99 in the captured image 36 captured by the camera 34 is in focus, the measurement light path length D1 changes, and the measurement light path length D1 becomes unequal to the reference light path length D2, which suppresses generation of the interference fringes 101 in the captured image 36.

As indicated with the reference numeral 3C in FIG. 3 and the reference numeral 4C in FIG. 4, after the focusing control by the focusing control unit 98 is completed, the operator manually adjusts (roughly adjusts) the position of the reference surface 24*c* in the X direction using the reference surface position adjustment mechanism 25 to make the reference light path length D2 roughly equal to the measurement light path length D1. For example, the operator operates the reference surface position adjustment mechanism 25 while observing the captured image 36 captured by the camera 34 to adjust the position of the reference surface 24*c* in the X direction to a position at which intensity of the interference fringes 101 in the captured image 36 becomes the highest.

As described above, in order to make the reference light path length D2 precisely equal to the measurement light path length D1 only using the reference surface position adjustment mechanism 25, the reference surface position adjustment mechanism 25 requires to have control resolution sufficiently smaller than a depth of field (for example, DOF=0.56 μm) of the objective lens 24*a*. On the other hand, in a case where the reference light path length D2 is merely made roughly equal to the measurement light path length D1 as in the present embodiment, even a screw-type reference surface position adjustment mechanism 25 can execute the adjustment.

After manual adjustment using the reference surface position adjustment mechanism 25 is completed, the temperature control unit 100 controls the temperature adjusting unit 26 to repeatedly perform imaging of the interference light L3 and output of the captured image 36 by the camera 34, and measurement of the temperature of the reference surface housing part 24*d*2 by the temperature sensor 28 while changing the temperature of the reference surface housing part 24*d*2 from the temporary target temperature. Note that a range of the temperature change of the reference surface housing part 24*d*2 is, for example, set within a certain range around the temporary target temperature.

Then, the temperature control unit 100 searches for (retrieves) and determines a target temperature at which the reference light path length D2 becomes equal to the measurement light path length D1 based on the captured images 36 and the temperature of the reference surface housing part 24*d*2 obtained while the temperature of the reference surface housing part 24*d*2 changes, while details will be described later. Further, the temperature control unit 100 controls the temperature adjusting unit 26 to adjust the temperature of the reference surface housing part 24*d*2 to the target temperature. In this case, the temperature control unit 100 functions as a target temperature control unit of the present invention.

Figure 5:
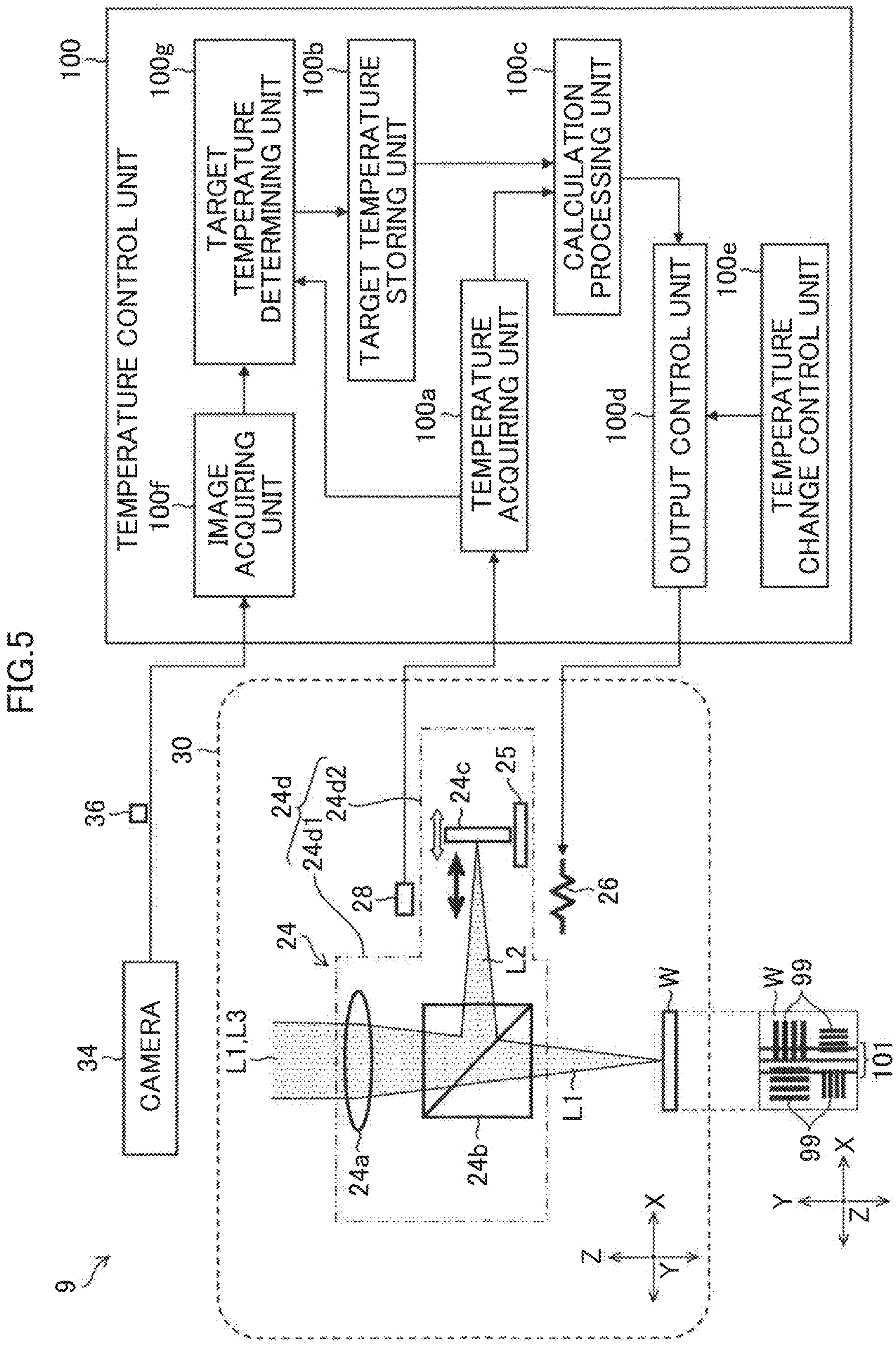
FIG. 5 is a functional block diagram of a temperature control unit.

FIG. 5 is a functional block diagram of the temperature control unit 100. As illustrated in FIG. 5, the temperature control unit 100 controls adjustment of the temperature of the reference surface housing part 24*d*2 to the temporary target temperature, the temperature change of the reference surface housing part 24*d*2, determination of the target temperature, and adjustment of the temperature of the reference surface housing part 24*d*2 to the target temperature.

Note that as a method for controlling the temperature of the reference surface housing part 24*d*2 by the temperature control unit 100, for example, feedback control is performed for adjusting the temperature of the reference surface housing part 24*d*2 based on the measurement result of the temperature sensor 28. Examples of the feedback control may include proportional-integral-differential (PID) control.

The temperature control unit 100 includes a temperature acquiring unit 100*a*, a target temperature storing unit 100*b*, a calculation processing unit 100*c*, an output control unit 100*d*, a temperature change control unit 100*e*, an image acquiring unit 100*f*, and a target temperature determining unit 100*g*.

The temperature acquiring unit 100*a* is, for example, an interface connected to the temperature sensor 28. The temperature acquiring unit 100*a* repeatedly performs acquisition of the temperature measurement result from the temperature sensor 28 and output of the temperature measurement result to the calculation processing unit 100*c* or the target temperature determining unit 100*g*, every time the temperature measurement result of the reference surface housing part 24*d*2 is repeatedly output from the temperature sensor 28. Note that the temperature acquiring unit 100*a* outputs the temperature measurement result to the calculation processing unit 100*c* when the temperature of the reference surface housing part 24*d*2 is adjusted to the temporary target temperature or the target temperature. Further, the temperature acquiring unit 100*a* outputs the temperature measurement result to the target temperature determining unit 100*g* in accordance with imaging of the interference light L3 by the camera 34, when the temperature of the reference surface housing part 24*d*2 changes.

The target temperature storing unit 100*b* stores the temporary target temperature determined in advance, based on a type of the interference objective lens 24 and the target temperature determined by the target temperature determining unit 100*g* which will be described later. Note that the target temperature storing unit 100*b* may be provided on a server on the Internet.

The calculation processing unit 100*c* acquires the temporary target temperature from the target temperature storing unit 100*b* before the target temperature is determined, and acquires the target temperature from the target temperature storing unit 100*b* after the target temperature is determined. Then, every time a new temperature measurement result is input from the temperature sensor 28, the calculation processing unit 100*c* calculates a difference between the temperature measurement result and the temporary target temperature or the target temperature (hereinafter, abbreviated as a "target temperature, or the like") and outputs the difference calculation result to the output control unit 100*d*.

The output control unit 100*d* performs temperature control of the temperature adjusting unit 26. The output control unit 100*d* stores, for example, a data table or an arithmetic expression that defines a relationship between the difference calculation result by the calculation processing unit 100*c* and a temperature adjustment amount by the temperature adjusting unit 26 necessary for adjusting the temperature of the reference surface housing part 24*d*2 to the target temperature, or the like. The output control unit 100*d* refers to the above-described data table, or the like, based on the difference calculation result input from the calculation processing unit 100*c*, and controls the temperature adjusting unit 26 so as to adjust the temperature of the reference surface housing part 24*d*2 to the target temperature, or the like.

In a case where, for example, the operating unit 17 executes temperature change start operation after manual adjustment using the reference surface position adjustment mechanism 25 by the operator, the temperature change control unit 100*e* controls the temperature adjusting unit 26 via the output control unit 100*d* to change the temperature of the reference surface housing part 24*d*2, for example, within a certain range around the temporary target temperature.

The image acquiring unit 100*f* is, for example, an interface connected to the camera 34. While the temperature of the reference surface housing part 24*d*2 changes, the image acquiring unit 100*f* causes the camera 34 to repeatedly capture the image of the interference light L3 and repeatedly performs acquisition of the captured image 36 from the camera 34, and to output the captured image 36 to the target temperature determining unit 100*g*.

The target temperature determining unit 100*g* determines the target temperature of the reference surface housing part 24*d*2. The camera 34 and the temperature acquiring unit 100*a* are connected to the target temperature determining unit 100*g*. Further, while the temperature adjusting unit 26 changes the temperature of the reference surface housing part 24*d*2, the target temperature determining unit 100*g* repeatedly acquires the captured image 36 from the image acquiring unit 100*f* and repeatedly acquires the temperature measurement result from the temperature acquiring unit 100*a*, to search for and determine the target temperature.

Specifically, the target temperature determining unit 100*g* detects the interference fringes 101 in the captured image 36 for each of the captured images 36 input from the image acquiring unit 100*f*, and further detects intensity (pixel value) of the interference fringes 101. Then, the target temperature determining unit 100*g* selects the captured image 36 in which the intensity of the interference fringes 101 is the highest, that is, the captured image 36 captured in a state where the measurement light path length D1 is equal to the reference light path length D2 among the plurality of captured images 36 input from the image acquiring unit 100*f*.

Then, the target temperature determining unit 100*g* determines the temperature measurement result corresponding to the selected captured image 36 as the target temperature and stores the target temperature in the target temperature storing unit 100*b*. By this means, by the temperature control unit 100 adjusting the temperature of the reference surface housing part 24*d*2 to the target temperature in a state where the objective lens 24*a* is focused on the surface to be measured W, the position of the reference surface 24*c* in the X direction is automatically adjusted so that the reference light path length D2 becomes equal to the measurement light path length D1.

Returning to FIG. 2, the measurement control unit 102 controls the drive mechanism 12, the light source unit 20 and the camera 34 to measure the three-dimensional shape of the surface to be measured W using the WLI system.

Specifically, the measurement control unit 102 controls the drive mechanism 12 to cause the white light interferometry microscope 10 to scan in the Z direction after causing the light source unit 20 to start emission of the measurement light L1. Further, while the drive mechanism 12 causes the white light interferometry microscope 10 to scan in the Z direction, the measurement control unit 102 causes the camera 34 to repeatedly capture the image of the interference light L3 and output the captured image 36 to the control device 16 every time the white light interferometry microscope 10 moves in the Z direction by a fixed pitch based on the detection result of the position of the white light interferometry microscope 10 in the Z direction by the scale 14. Then, the captured image 36 for each pitch is input to the shape calculating unit 104 from the camera 34.

Here, because the position of the camera 34 in the Z direction when the camera 34 captures the image of the interference light L3 may be detected by the scale 14, the pitch when the white light interferometry microscope 10 scans in the Z direction is not limited to the fixed pitch and may be a variable pitch (the same will apply below).

Figure 6:
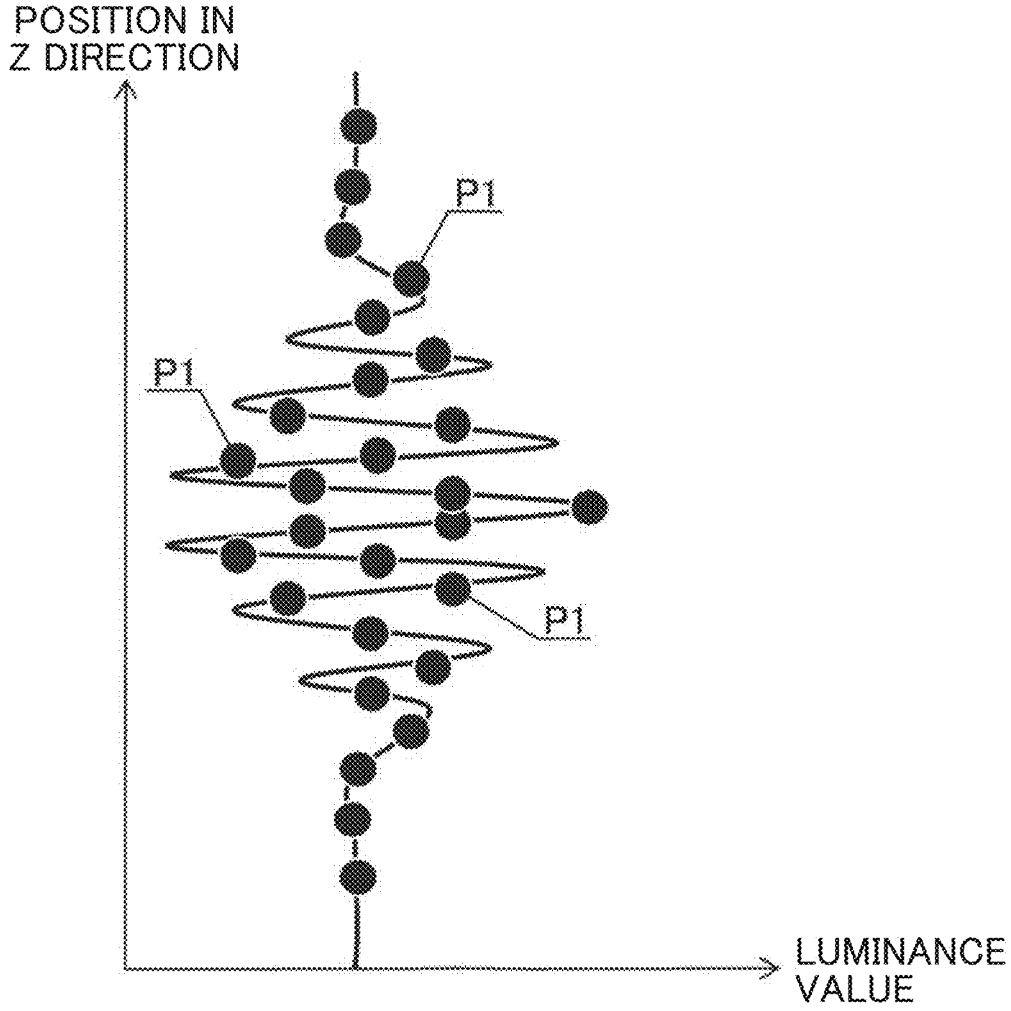
FIG. 6 is an explanatory diagram for describing calculation of a three-dimensional shape of a surface to be measured by a shape calculating unit.

FIG. 6 is an explanatory diagram for describing calculation of the three-dimensional shape of the surface to be measured W by the shape calculating unit 104. The shape calculating unit 104 calculates the three-dimensional shape of the surface to be measured W. The shape calculating unit 104 acquires the captured image 36 input from the camera 34 via the interface like the image acquiring unit 100*f* described above, every time the white light interferometry microscope 10 moves by the fixed pitch.

Then, as illustrated in FIG. 6, the shape calculating unit 104 detects luminance values for each pixel in the respective captured images 36 in which the interference fringes 101 are generated. Further, the shape calculating unit 104 compares the luminance values (see a reference numeral P1) for each pixel on the same coordinate in the respective captured images 36 (imaging elements of the camera 34). Here, FIG. 6 indicates a relationship between a luminance value and the position in the Z direction, in one arbitrary pixel. The shape calculating unit 104 determines the position in the Z direction at which the luminance value for each pixel on the same coordinate of the respective captured images 36 become maximum, in order to calculate height information of the surface to be measured W for each pixel on the same coordinate. By this means, the three-dimensional shape of the surface to be measured W is obtained. Note that calculation of the three-dimensional shape of the surface to be measured W using the WLI system is a publicly known technique (see Patent Literature 1 described above), and thus, detailed description will be omitted here.

Operation of First Embodiment

Figure 7:
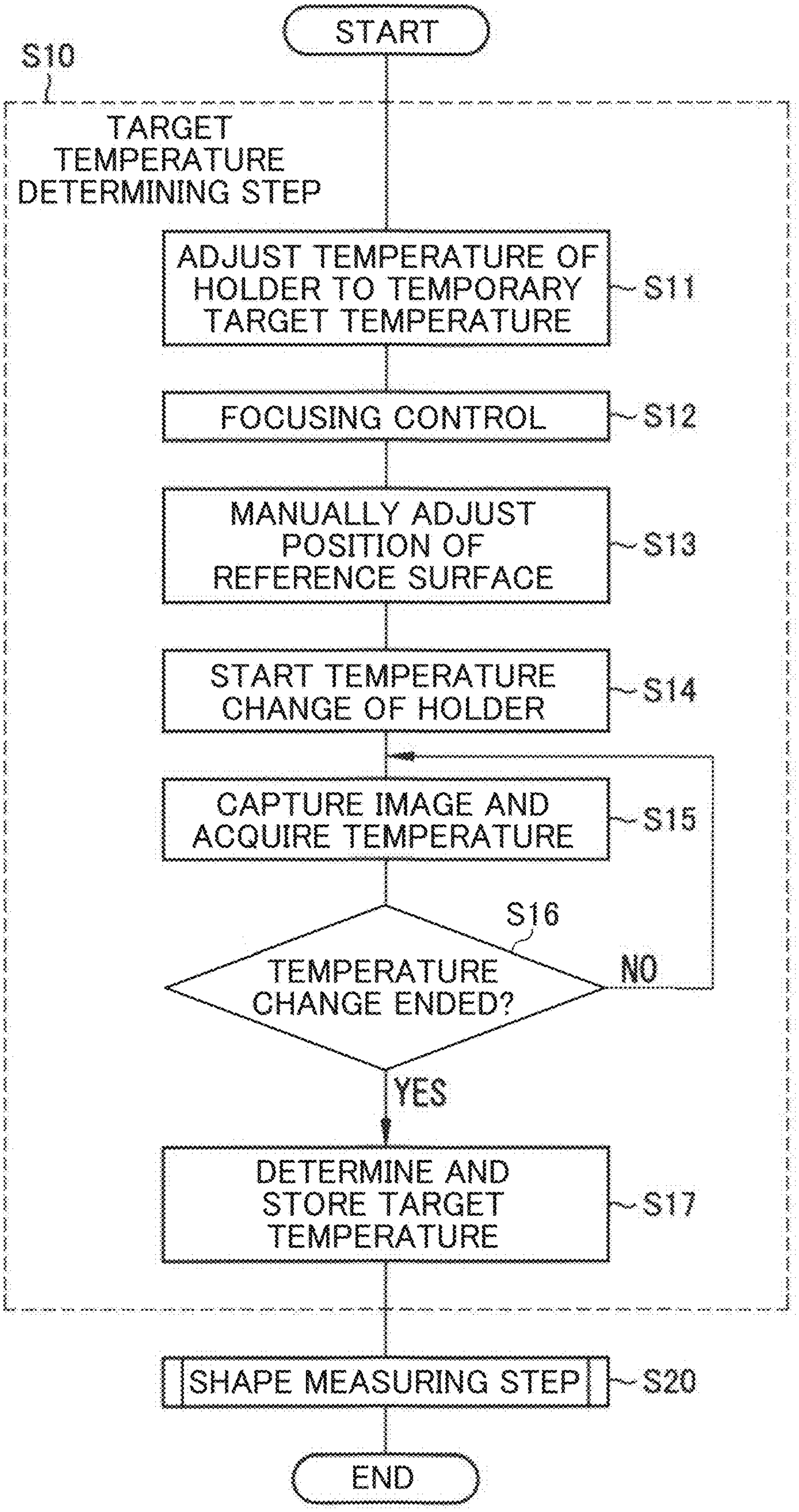
FIG. 7 is a flowchart indicating processing of measuring a three-dimensional shape of a surface to be measured, particularly, flow of a reference surface position adjustment method by the three-dimensional shape measuring device according to the first embodiment.

FIG. 7 is a flowchart indicating flow of processing of measuring the three-dimensional shape of the surface to be measured W, particularly, a reference surface position adjustment method by the three-dimensional shape measuring device 9 according to the first embodiment. As indicated in FIG. 7, the processing of measuring the three-dimensional shape of the surface to be measured W by the three-dimensional shape measuring device 9 is roughly divided into a target temperature determining step S10 and a shape measuring step S20.

In the target temperature determining step S10, the target temperature of the reference surface housing part 24*d*2 (holder 24*d*) is determined. Note that the target temperature determining step S10 is, for example, executed every time a new interference objective lens 24 is attached to the white light interferometry microscope 10 or for each fixed period.

First, the operator sets the surface to be measured W on which the test pattern 99 is formed at the white light interferometry microscope 10. Note that various kinds of patterns formed on the surface W for which a three-dimensional shape is to be measured, may be used as the test pattern 99.

After setting of the surface to be measured W (test pattern 99) at the white light interferometry microscope 10 is completed, in a case where the operator operates the operating unit 17 to perform operation of starting determination of the target temperature, the temperature acquiring unit 100*a* repeatedly performs acquisition of the temperature measurement result of the reference surface housing part 24*d*2 from the temperature sensor 28 and output of the temperature measurement result to the calculation processing unit 100*c*.

Further, at the same time, the calculation processing unit 100*c* acquires information on the temporary target temperature from the target temperature storing unit 100*b*. Then, every time a new temperature measurement result is input from the temperature acquiring unit 100*a*, the calculation processing unit 100*c* calculates a difference between the temperature measurement result and the temporary target temperature and outputs the difference calculation result to the output control unit 100*d*. Then, the output control unit 100*d* controls the temperature adjusting unit 26 based on the difference calculation result to adjust the temperature of the reference surface housing part 24*d*2 to the temporary target temperature (step S11, corresponding to a temporary target temperature adjusting step of the present invention).

In this event, in the present embodiment, because the interference objective lens 24, the temperature adjusting unit 26 and the temperature sensor 28 are covered with the heat insulating material 30, the temperature inside the heat insulating material 30, particularly, the temperatures of the reference surface housing part 24*d*2 and the vicinity of the reference surface housing part 24*d*2 may be made stable at the temporary target temperature.

In a case where the temperature of the reference surface housing part 24*d*2 is adjusted to the temporary target temperature based on the temperature measurement result of the temperature sensor 28, the focusing control unit 98 controls the light source unit 20, the drive mechanism 12 and the camera 34 to perform focusing control of focusing the objective lens 24*a* to the test pattern 99 (step S12, corresponding to a focusing step of the present invention). Note that step S12 may be executed before step S11 or at the same time as step S11.

When the focusing control is completed, the operator manually adjusts the position of the reference surface 24*c* in the X direction using the reference surface position adjustment mechanism 25 to make the reference light path length D2 roughly equal to the measurement light path length D1 (step S13, corresponding to a rough position adjusting step of the present invention). As described above, because it is only necessary to make the reference light path length D2 roughly equal to the measurement light path length D1, even the screw-type reference surface position adjustment mechanism 25 may execute the adjustment. Thus, cost of the white light interferometry microscope 10 may be reduced. Then, the operator performs operation of starting temperature change of the reference surface housing part 24*d*2 at the operating unit 17.

In a case where the operation to start temperature change is performed at the operating unit 17, the temperature change control unit 100*e* controls the temperature adjusting unit 26 via the output control unit 100*d* to start temperature change of the reference surface housing part 24*d*2 (step S14, corresponding to a temperature changing step of the present invention).

In a case where the temperature change of the reference surface housing part 24*d*2 is started, the image acquiring unit 100*f* causes the camera 34 to repeatedly capture the image of the interference light L3. Further, the image acquiring unit 100*f* repeatedly executes acquisition of the captured image 36 from the camera 34 and output of the captured image 36 to the target temperature determining unit 100*g* (step S15, corresponding to an imaging step of the present invention). At the same time, the temperature acquiring unit 100*a* repeatedly acquires the temperature measurement result by the temperature sensor 28 at the same timing as imaging of the interference light L3 by the camera 34 and repeatedly outputs the temperature measurement result to the target temperature determining unit 100*g* (step S15, corresponding to a temperature acquiring step of the present invention).

Hereinafter, while the temperature change of the reference surface housing part 24*d*2 continues, output of the captured image 36 from the image acquiring unit 100*f* to the target temperature determining unit 100*g* and output of the temperature measurement result from the temperature acquiring unit 100*a* to the target temperature determining unit 100*g* are repeatedly executed (step S16: No).

After the temperature change of the reference surface housing part 24*d*2 is completed (step S16: Yes), the target temperature determining unit 100*g* selects the captured image 36 in which intensity of the interference fringes 101 becomes maximum among the respective captured images 36 input from the image acquiring unit 100*f* and determines the temperature measurement result corresponding to the selected captured image 36 as the target temperature (step S17, corresponding to a target temperature determining step of the present invention). Then, the target temperature determining unit 100*g* stores the determined target temperature in the target temperature storing unit 100*b*. Then, all the processing of the target temperature determining step S10 completes.

Figure 8:
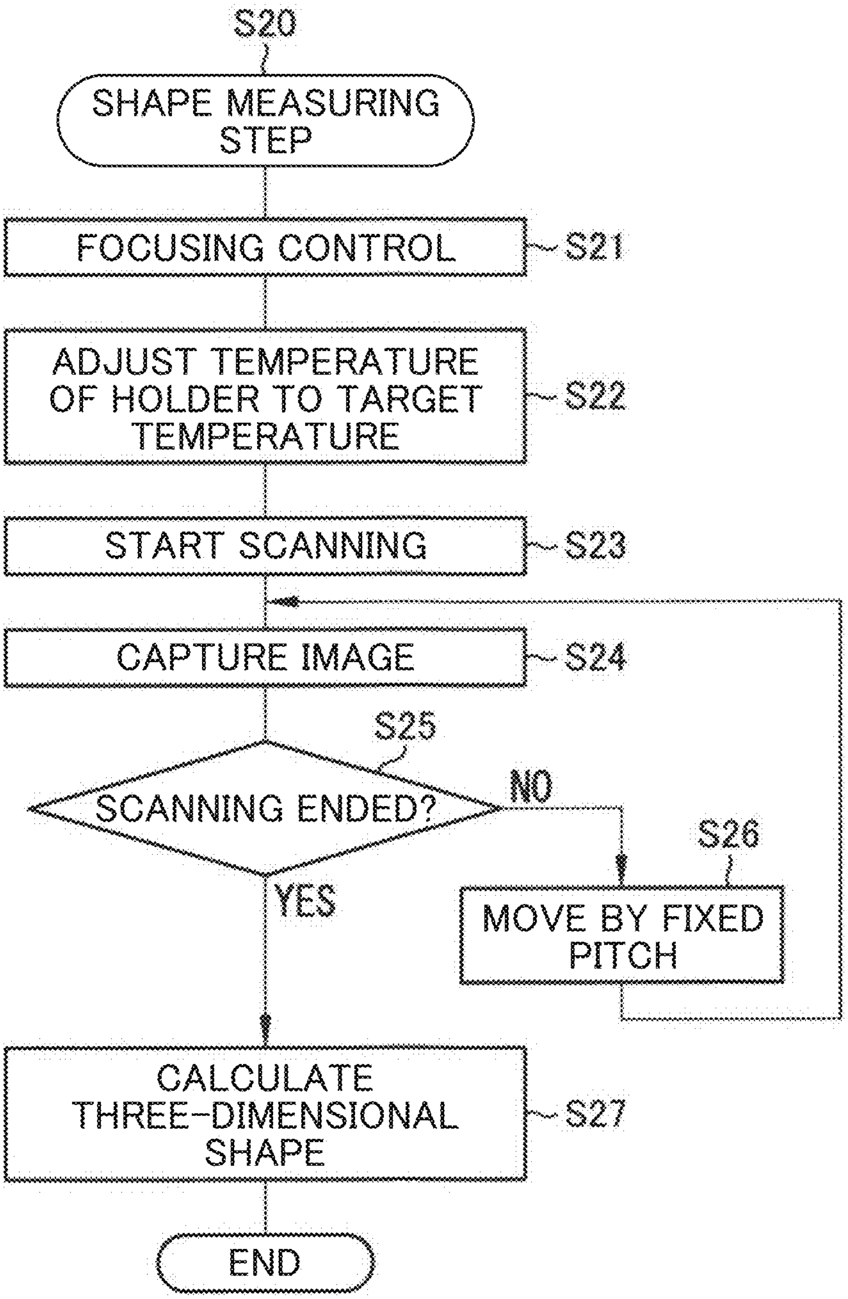
FIG. 8 is a flowchart indicating flow of processing of a shape measuring step in FIG. 7.

FIG. 8 is a flowchart indicating flow of the processing in the shape measuring step S20 in FIG. 7. As indicated in FIG. 8, after the target temperature determining step S10 is completed, the operator sets the surface to be measured W of a measurement object on the white light interferometry microscope 10 and operates the operating unit 17 to perform operation of starting measurement of the three-dimensional shape of the surface to be measured W.

If the operation of starting measurement is performed, the focusing control unit 98 performs focusing control similar to step S13 described above to focus the objective lens 24*a* on the surface to be measured W (step S21). Note that the focusing control in step S21 may be omitted.

If the focusing control is completed, the temperature acquiring unit 100*a* repeatedly performs acquisition of the temperature measurement result of the reference surface housing part **24*d*2 from the temperature sensor 28 and output of the temperature measurement result to the calculation processing unit 100*c***.

Further, at the same time, the calculation processing unit **100*c* acquires information on the target temperature from the target temperature storing unit 100*b*, and every time a new temperature measurement result of the temperature sensor 28 is input from the temperature acquiring unit 100*a*, outputs a calculation result (difference calculation result) of difference between the temperature measurement result and the target temperature to the output control unit 100*d*. Then, the output control unit 100*d* controls the temperature adjusting unit 26 based on the difference calculation result so as to adjust the temperature of the reference surface housing part 24*d*2 to the target temperature by (step S22, corresponding to a target temperature adjusting step of the present invention). Note that, because the interference objective lens 24, the temperature adjusting unit 26 and the temperature sensor 28 are covered with the heat insulating material 30, the temperatures of the reference surface housing part 24*d*2 and the vicinity of the reference surface housing part 24*d*2** are made stable at the target temperature.

Because the temperature of the reference surface housing part **24*d*2 is adjusted to the target temperature determined in the target temperature determining step S10, it is possible to automatically adjust the position of the reference surface 24*c* in the X direction to a position at which the reference light path length D2 becomes equal to the measurement light path length D1, using the thermal deformation of the reference surface housing part 24*d*2**.

Here, for example, in a case where a linear thermal expansion coefficient of brass is set at $20\times10^{-6}$ (1/° C.), and the reference light path length D2 is set at 5 mm, a change amount of the position of the reference surface **24*c* in the X direction with respect to a temperature change per 1° C. of the reference surface housing part 24*d*2 becomes 0.1 μm $[=(20\times10^{-6})\times(5\times10^{-3})\times1]$. Typically, temperature control in units of 1° C. is easy, and thus, in a case where the position of the reference surface 24*c* in the X direction is adjusted by adjusting the temperature of the reference surface housing part 24*d*2, it is possible to obtain control resolution sufficient for a depth of field (DOF=0.56 μm) of the objective lens 24*a*. By this means, in a state where the objective lens 24*a* is focused on the surface to be measured W, it is possible to make the reference light path length D2 equal to the measurement light path length D1 with high accuracy. This enables to obtain stronger intensity of the interference fringes 101 included in the interference light L3 generated at the beam splitter 24*b***.

Further, in the present embodiment, the temperature of the reference surface housing part **24*d*2 may be adjusted and maintained at the target temperature by the temperature adjusting unit 26 regardless of a temperature of an installation environment of the white light interferometry microscope 10, so that it is possible to maintain a state where the reference light path length D2 is made equal to the measurement light path length D1**.

A timing at which step S22 is executed is not limited to this embodiment. For example, execution of step S22 may be started when a system (three-dimensional shape measuring device 9) is powered on, and the temperature of the holder (reference surface housing part **24*d*2**) may be continuously adjusted until measurement of all the measurement objects (surface to be measured W) completes.

Further, when the temperature of the reference surface housing part **24*d*2 is adjusted to the target temperature based on the temperature measurement result of the temperature sensor 28, the measurement control unit 102 controls the drive mechanism 12 to start scanning of the white light interferometry microscope 10 in the Z direction (step S23). Further, the measurement control unit 102 causes the camera 34 to repeatedly capture the image of the interference light L3 every time the white light interferometry microscope 10 moves in the Z direction by a fixed pitch based on the detection result of the position of the white light interferometry microscope 10 in the Z direction by the scale 14 (step S24, step S25: No, step S26). By this means, the captured images 36 in which the interference fringes 101 are generated are sequentially input to the shape calculating unit 104 from the camera 34**.

In a case where the scanning of the white light interferometry microscope 10 ends (completes) (step S25: Yes), the shape calculating unit 104 detects luminance values for each pixel of the respective captured images 36 in which the interference fringes 101 are generated, determines the position in the Z direction at which the luminance value becomes maximum for each pixel on the same coordinate in the respective captured images 36, thereby calculates height information of the surface to be measured W for each pixel on the same coordinate. By this means, the shape calculating unit 104 calculates the three-dimensional shape of the surface to be measured W (step S27).

Hereinafter, every time the surface to be measured W that is the measurement object changes, the processing from step S21 (step S21 may be omitted) to step S27 described above is repeatedly executed. Note that in a case where the interference objective lens 24 attached to the white light interferometry microscope 10 is switched, the processing is executed again from the target temperature determining step S10 described above.

As described above, in the first embodiment, the target temperature of the reference surface housing part **24*d*2 is determined in advance such that the reference light path length D2 becomes equal to the measurement light path length D1 in a state where the objective lens 24*a* is focused on the surface to be measured W and adjusting the temperature of the reference surface housing part 24*d*2 to the target temperature. Thereby, the reference light path length D2 may be automatically made equal to the measurement light path length D1 with high accuracy. Further, the reference surface position adjustment mechanism 25 is not required to be an expensive high-resolution position adjustment mechanism. It is possible to maintain a state where the reference light path length D2 is equal to the measurement light path length D1 with low cost, regardless of a temperature of an installation environment of the white light interferometry microscope 10**.

Second Embodiment

The three-dimensional shape measuring device 9 according to a second embodiment of the present invention will be described next. In the three-dimensional measuring device 9 according to the first embodiment described above, in a case where the target temperature of the reference surface housing part **24*d*2 is determined, the operator manually adjusts the reference surface position adjustment mechanism 25 so as to make the reference light path length D2 roughly equal to the measurement light path length D1. In contrast, the three-dimensional shape measuring device 9 according to the second embodiment automatically determines the target temperature of the reference surface housing part 24*d*2 without manual adjustment using the reference surface position adjustment mechanism 25**.

Figure 9:
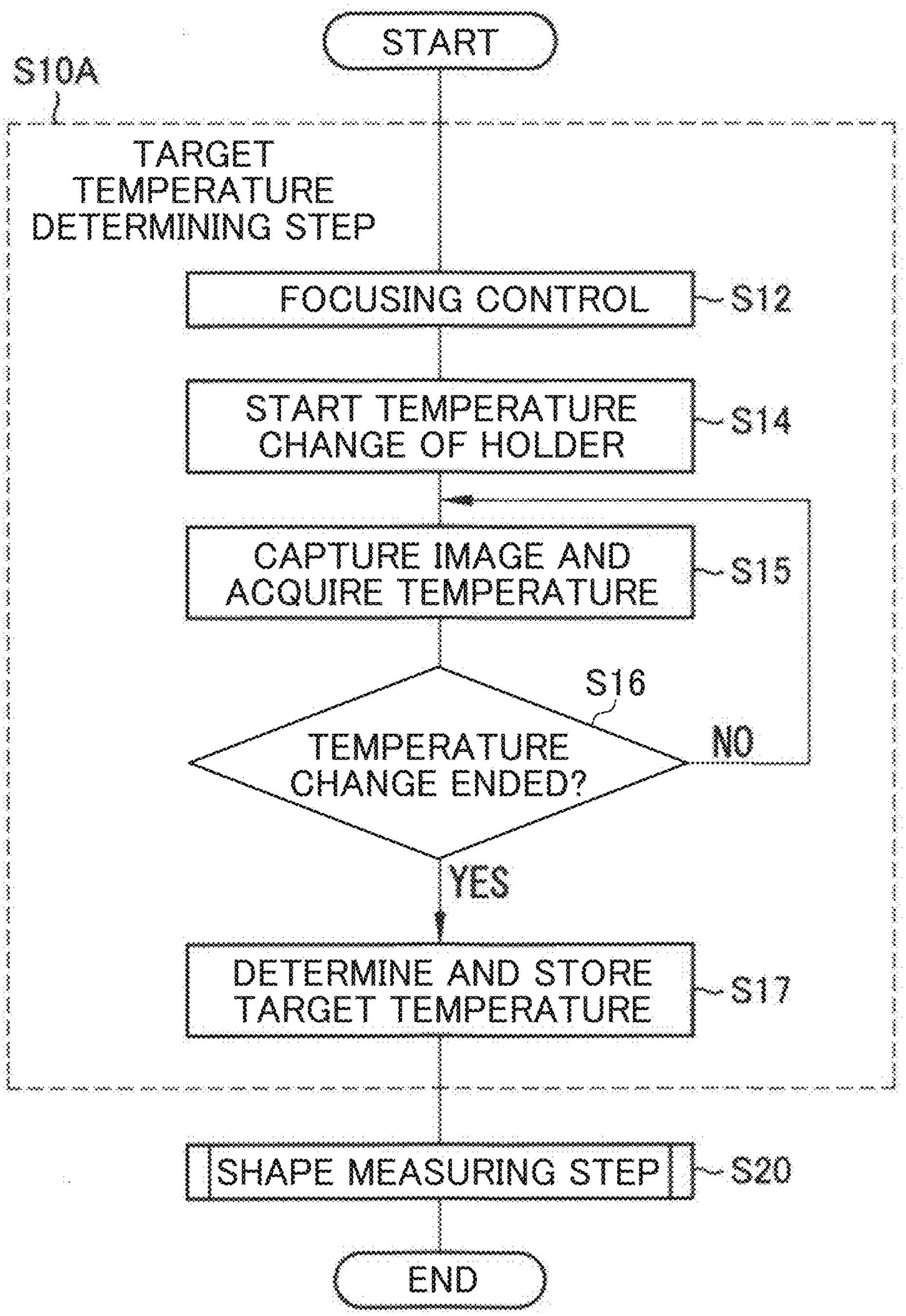
FIG. 9 is a flowchart indicating flow of processing of measuring a three-dimensional shape of a surface to be measured by a three-dimensional shape measuring device according to a second embodiment.

FIG. 9 is a flowchart indicating flow of processing of measuring the three-dimensional shape of the surface to be measured W by the three-dimensional shape measuring device 9 according to the second embodiment. Note that the three-dimensional shape measuring device 9 according to the second embodiment has basically the same configuration as the configuration of the three-dimensional shape measuring device 9 according to the first embodiment described above, except that a target temperature determining step S10A is executed in place of the target temperature determining step S10 according to the first embodiment described above. Thus, functions or components that are the same as those according to the first embodiment will be denoted by the same reference numerals, and description thereof will be omitted.

As indicated in FIG. 9, in the target temperature determining step S10A according to the second embodiment, after the surface to be measured W is set at the white light interferometry microscope 10, if the operator operates the operating unit 17 to perform operation of starting determination of the target temperature, the focusing control unit 98 performs focusing control of focusing the objective lens 24*a* to the test pattern 99 (step S12).

In the second embodiment, in a case where the focusing control is completed, the temperature change control unit 100*e* controls the temperature adjusting unit 26 via the output control unit 100*d* to start temperature change of the reference surface housing part 24*d*2 (step S14). Here, in the second embodiment, because the reference light path length D2 is not made roughly equal to the measurement light path length D1 in advance as in the first embodiment, it is preferable to set a range of the temperature change of the reference surface housing part 24*d*2 wider than that in the first embodiment.

Hereinafter, in a similar manner to the first embodiment (see FIG. 7), while the temperature change of the reference surface housing part 24*d*2 continues, output of the captured image 36 from the image acquiring unit 100*f* to the target temperature determining unit 100*g* and output of the temperature measurement result from the temperature acquiring unit 100*a* to the target temperature determining unit 100*g* are repeatedly executed (step S15, step S16: No).

Then, the target temperature determining unit 100*g* determines the target temperature and stores the target temperature in the target temperature storing unit 100*b* in a similar manner to the first embodiment based on a plurality of the captured images 36 input from the image acquiring unit 100*f* while the temperature of the reference surface housing part 24*d*2 changes and temperature measurement results input from the temperature acquiring unit 100*a* (step S16: Yes, step S17). As described above, all the processing in the target temperature determining step S10A according to the second embodiment ends. Note that the shape measuring step S20 is the same as that in the first embodiment (see FIG. 8), and thus, specific description will be omitted.

As described above, in the second embodiment, because the target temperature of the reference surface housing part 24*d*2 may be all automatically determined without manual adjustment using the reference surface position adjustment mechanism 25, the second embodiment may achieve an effect that measurement of the three-dimensional shape of the surface to be measured W is made more efficient (automated) than the first embodiment, in addition to the effects in the first embodiment.

Third Embodiment

Figure 10:
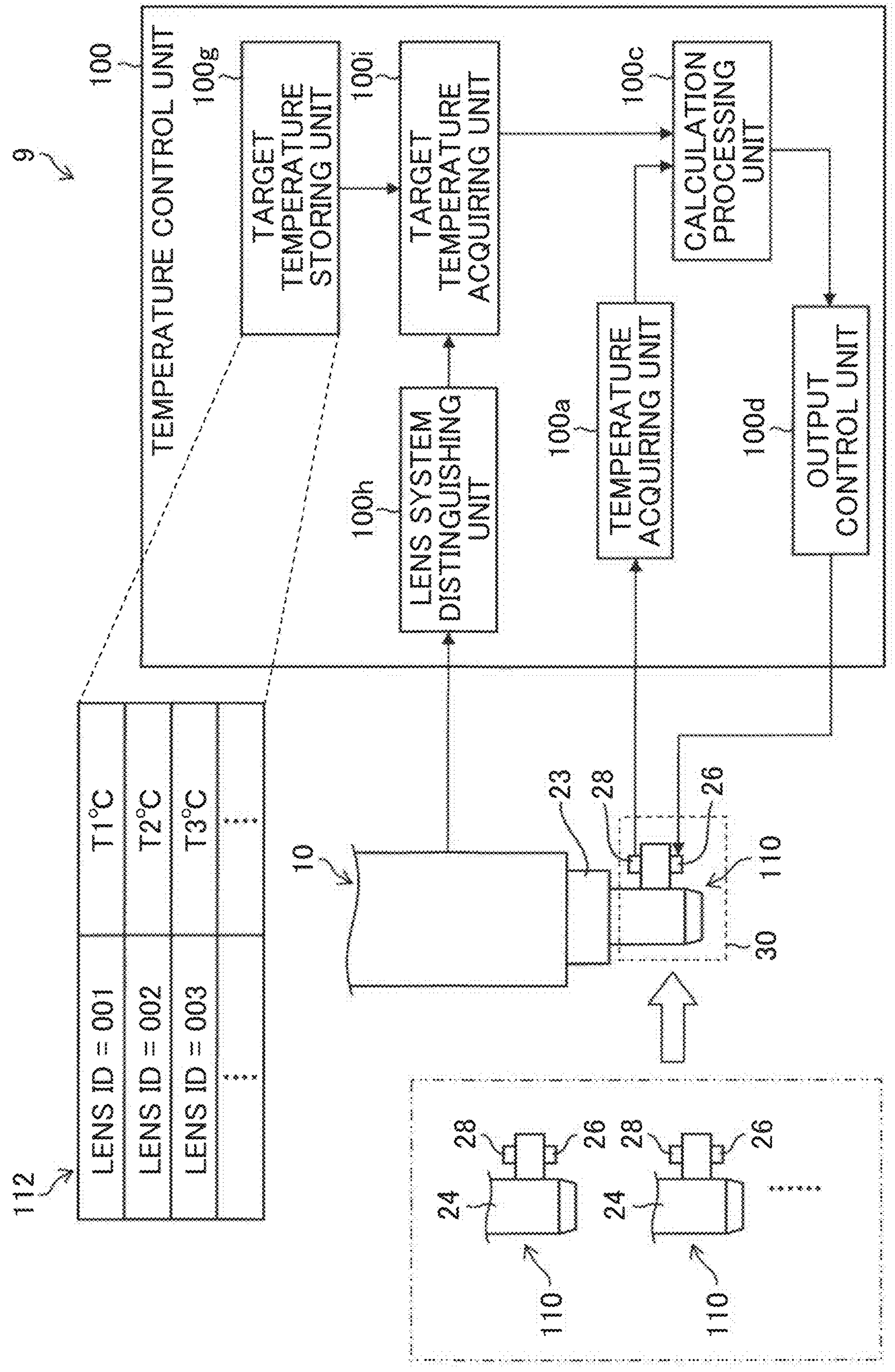
FIG. 10 is a functional block diagram of a temperature control unit of a three-dimensional shape measuring device according to a third embodiment.

FIG. 10 is a functional block diagram of the temperature control unit 100 of the three-dimensional shape measuring device 9 according to a third embodiment. An adapter part 23 is provided to the white light interferometry microscope 10 of the three-dimensional shape measuring device 9 according to the third embodiment. To the adapter part 23A, one of a plurality of lens systems 110 in each of which the temperature adjusting unit 26 and the temperature sensor 28 are attached to the interference objective lens 24, is selectively attached.

Here, temperature variation due to a position of the temperature adjusting unit 26, a position of the temperature sensor 28, a state of the heat insulating material 30, and the like, occurs in the lens systems 110. There is an individual difference in the temperature variation for each of the lens systems 110, and the target temperature is not necessarily common even among the lens systems 110 including the same type of the interference objective lens 24. It is therefore necessary to manage the target temperature for each lens system 110. Thus, the three-dimensional shape measuring device 9 according to the third embodiment manages the target temperature for each of the plurality of lens systems 110 and adjusts the temperature of the reference surface housing part 24*d*2 in accordance with the target temperature corresponding to the lens system 110 attached to the adapter part 23.

As illustrated in FIG. 10, the three-dimensional shape measuring device 9 according to the third embodiment has basically the same configuration as the configuration of the three-dimensional shape measuring device 9 of the above-described embodiments except that a database 112 is stored in the target temperature storing unit 100*b* of the temperature control unit 100, and that the temperature control unit 100 functions as a lens system distinguishing unit 100*h* and a target temperature acquiring unit 100*i*. Thus, functions and components that are the same as those in the above-described embodiments will be denoted by the same reference numerals, and description thereof will be omitted. Note that in FIG. 10, illustration of functions of a part (the temperature change control unit 100*c*, the image acquiring unit 100*f* and the target temperature determining unit 100*g*) of the temperature control unit 100 is omitted to prevent the drawing from being complicated.

The database 112 stores information indicating a correspondence relationship between a lens identification (ID) that is unique identification information (individual identification number) for each lens system 110 and a target temperature determined in the target temperature determining step S10, S10A described above for each lens system 110. Note that the database 112 may be provided in an external server instead of being provided within the target temperature storing unit 100*b*.

The lens system distinguishing unit 100*h* distinguishes a lens ID of the lens system 110 attached to the adapter part 23 and outputs the distinguishing result to the target temperature acquiring unit 100*i*. For example, an ID storing unit (not illustrated) that stores the lens ID may be provided in the lens system 110, and the lens system distinguishing unit 100*h* may distinguish the lens ID by acquiring the lens ID from the ID storing unit. Further, the lens system distinguishing unit 100*h* may distinguish the lens ID based on the lens ID input from the operating unit 17 operated by the operator.

The target temperature acquiring unit 100*i* acquires the target temperature corresponding to the lens ID from the database 112 based on the lens ID input from the lens system distinguishing unit 100*h* and outputs the target temperature to the calculation processing unit 100*c*. By this means, the calculation processing unit 100*c* calculates a difference between the temperature measurement result of the temperature sensor 28 repeatedly input from the temperature acquiring unit 100*a* and the target temperature input from the target temperature acquiring unit 100*i*. Then, in a similar manner to the above-described embodiments, the output control unit 100*d* controls the temperature adjusting unit 26 based on the difference calculation result, so as to adjust the temperature of the reference surface housing part 24*d*2 of the lens system 110 to the target temperature (temporary target temperature).

As described above, in the third embodiment, the target temperature corresponding to the lens system 110 attached to the adapter part 23 may be acquired from the database 112, so that the temperature of the reference surface housing part 24*d*2 may be adjusted to the target temperature determined for each lens system 110. This results in making it possible to reliably make the reference light path length D2 equal to the measurement light path length D1 in a state where the objective lens 24*a* is focused on the surface to be measured W while suppressing influence of the individual difference of the lens systems 110. By this means, it is possible to measure the three-dimensional shape of the surface to be measured W with higher accuracy.

Fourth Embodiment

Figure 11:
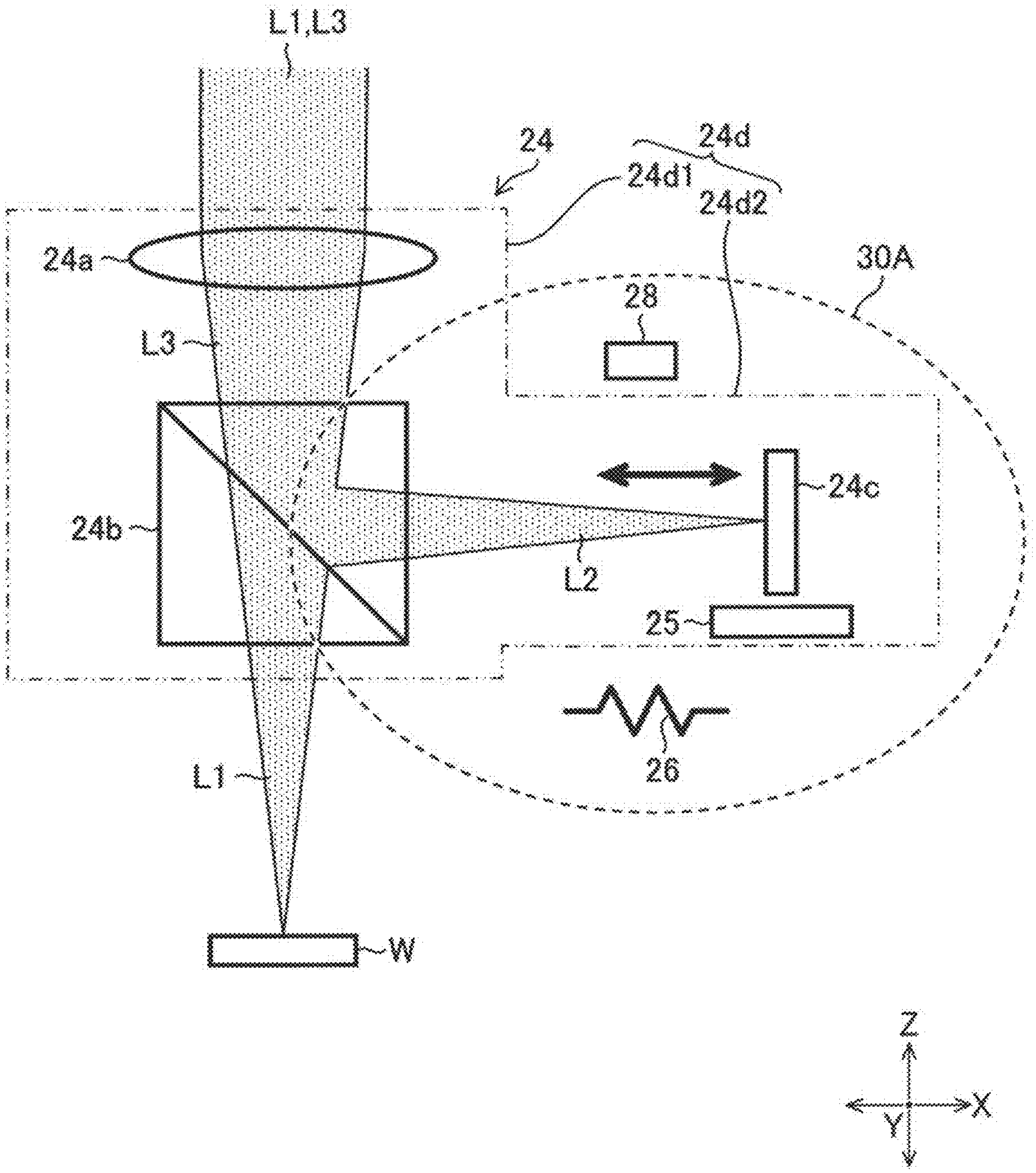
FIG. 11 is an enlarged view of an interference objective lens and a heat insulating material of a white light interferometry microscope of a three-dimensional shape measuring device according to a fourth embodiment.

FIG. 11 is an enlarged view of the interference objective lens 24 and a heat insulating material 30A of the white light interferometry microscope 10 of the three-dimensional shape measuring device 9 according to a fourth embodiment.

While in the above-described embodiments, the heat insulating material 30 covers the whole of the interference objective lens 24, the temperature adjusting unit 26 and the temperature sensor 28, as illustrated in FIG. 11, in the fourth embodiment, the heat insulating material 30A covers only the reference surface housing part 24*d*2, the temperature adjusting unit 26 and the temperature sensor 28. Note that the fourth embodiment has basically the same configuration as the above-described embodiments except that the heat insulating material 30A different from the heat insulating material 30 of the above-described embodiments is provided. Thus, functions and components that are the same as those in the above-described embodiments will be denoted by the same reference numerals, and description thereof will be omitted.

In this manner, because the heat insulating material 30A covers the reference surface housing part 24*d*2, the temperature adjusting unit 26 and the temperature sensor 28, the temperatures of the reference surface housing part 24*d*2 and the vicinity of the reference surface housing part 24*d*2 may be made stable at the target temperature (temporary target temperature) in a similar manner to the above-described embodiments. Further, because it is possible to minimize aberration of the objective lens 24*a* caused by heat generated at the temperature adjusting unit 26, measurement of the three-dimensional shape of the surface to be measured W is made tolerant to temperature change. This results in making it possible to measure the three-dimensional shape of the surface to be measured W with further higher accuracy and reliability.

Fifth Embodiment

Figure 12:
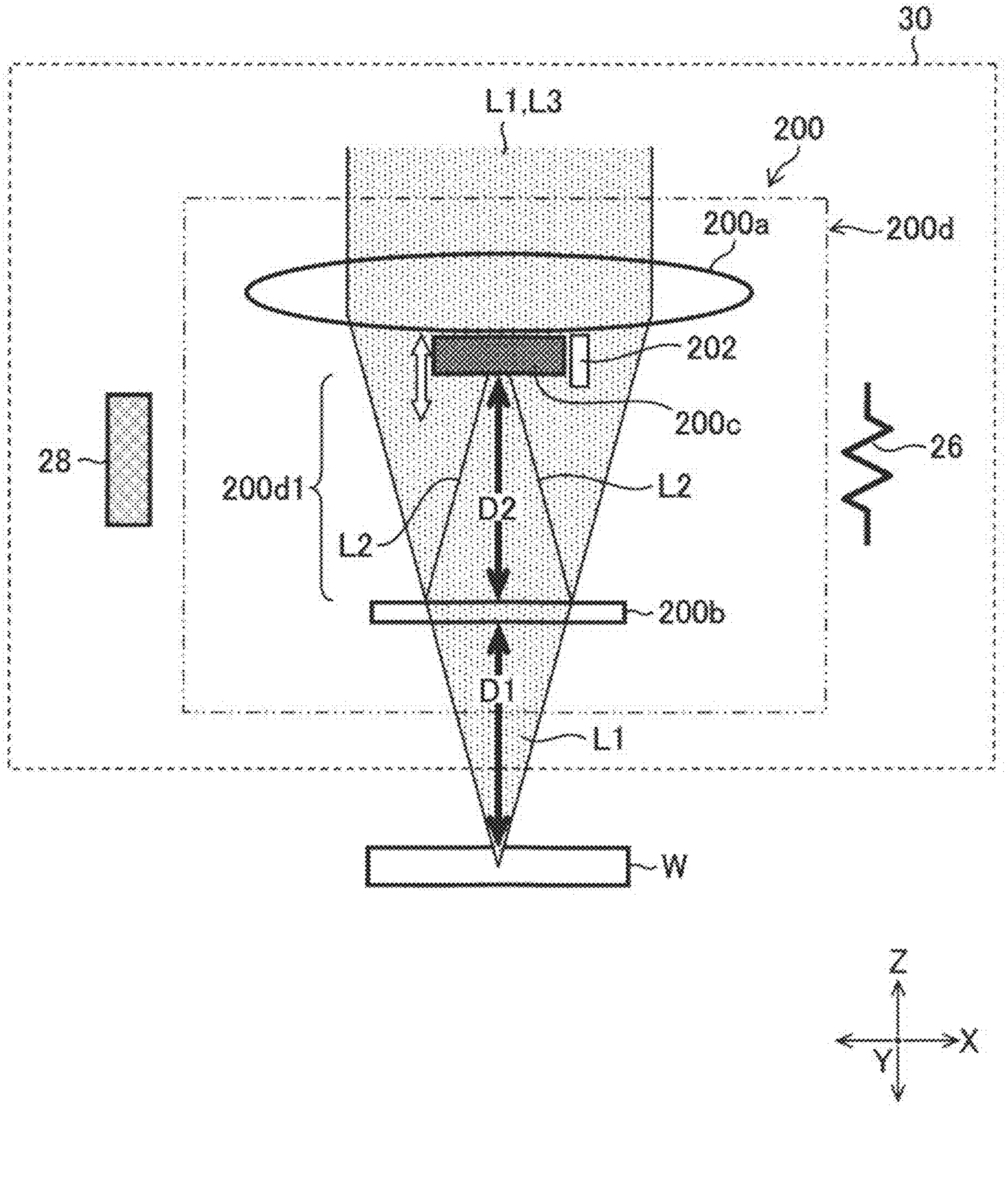
FIG. 12 is an enlarged view of an interference objective lens of a white light interferometry microscope of a three-dimensional shape measuring device according to a fifth embodiment.
Figure 13:
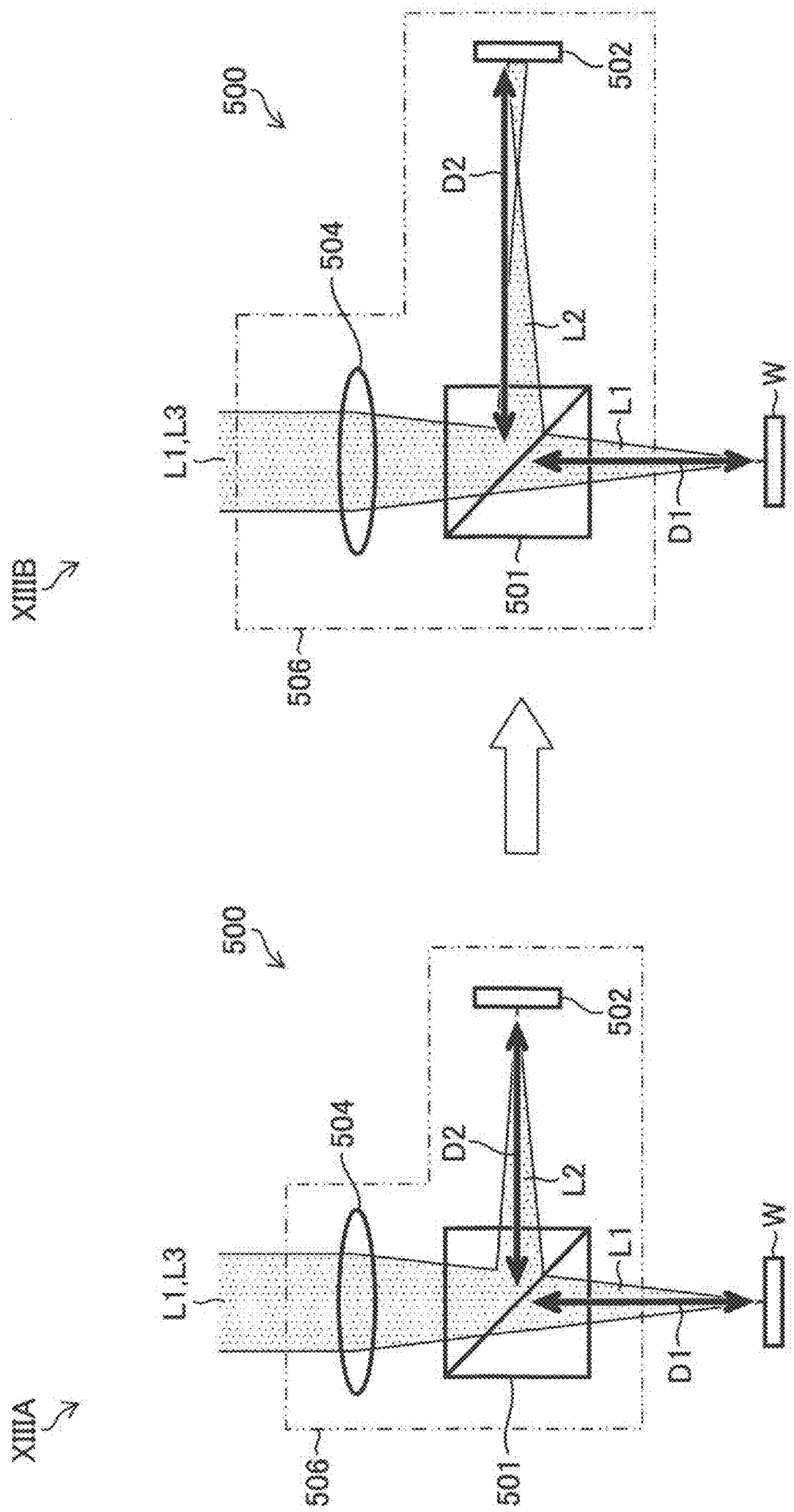
FIG. 13 is an explanatory diagram for describing problems of a white light interferometry microscope constituting a three-dimensional shape measuring device in related art.
Figure 14:
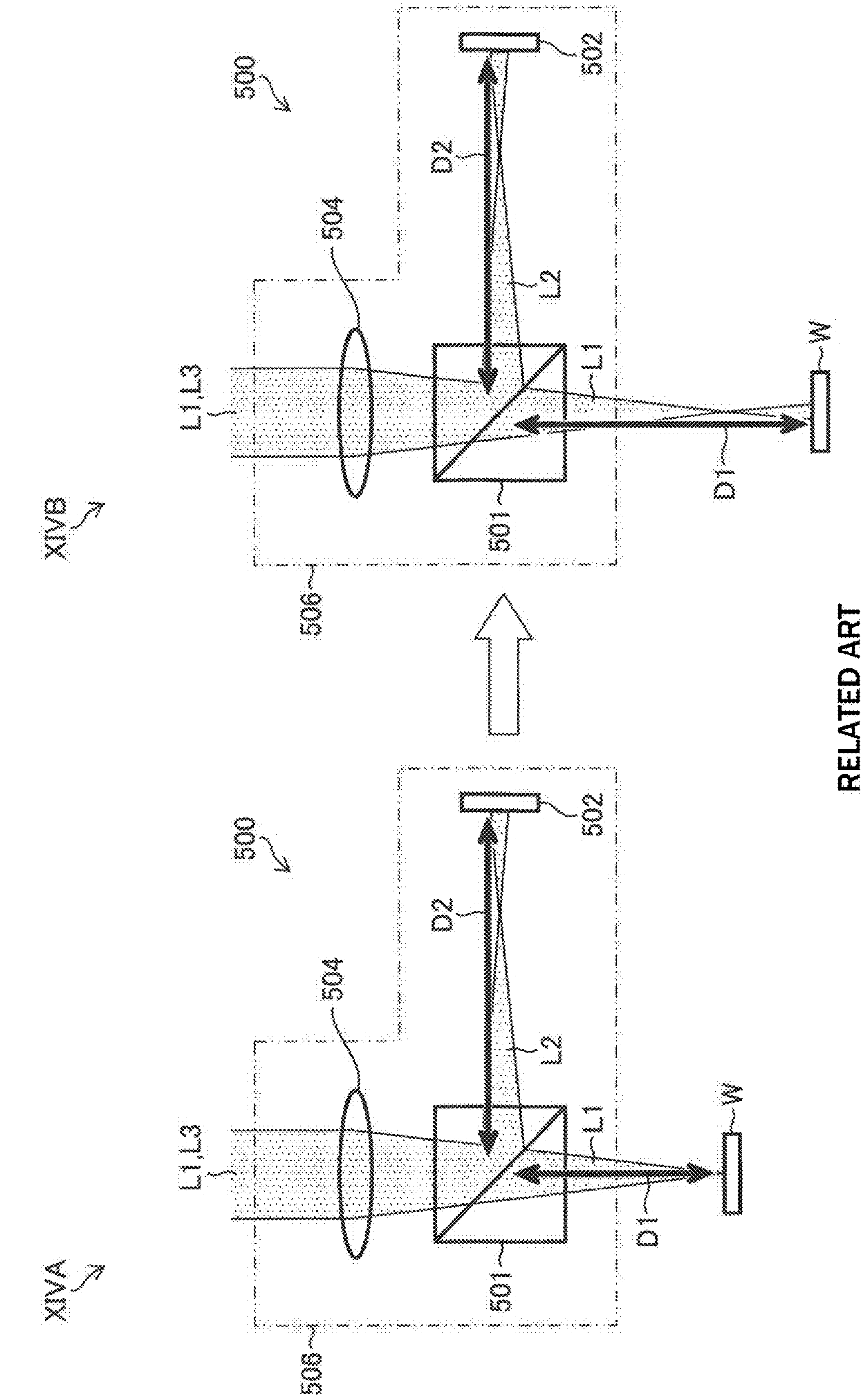
FIG. 14 is an explanatory diagram for describing problems of the white light interferometry microscope constituting the three-dimensional shape measuring device in related art.
Figure 15:
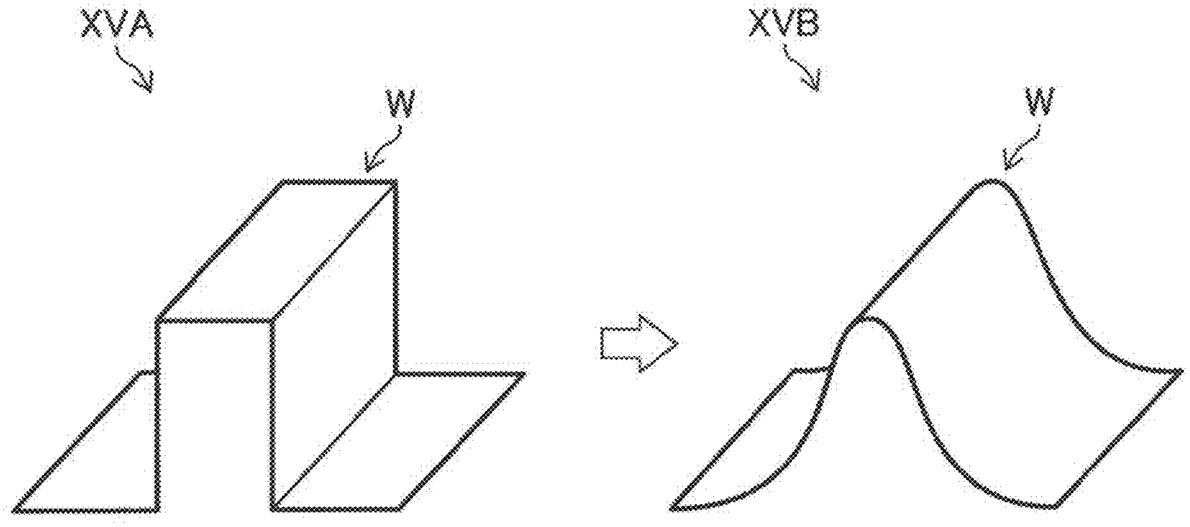
FIG. 15 is an explanatory diagram for describing problems of the white light interferometry microscope constituting the three-dimensional shape measuring device in related art.

FIG. 12 is an enlarged view of the interference objective lens 200 of the white light interferometry microscope 10 of the three-dimensional shape measuring device 9 according to a fifth embodiment.

While in the above-described embodiments, the Michelson-type interference objective lens 24 is provided in the white light interferometry microscope 10, as illustrated in FIG. 12, in the fifth embodiment, a Mirau-type interference objective lens 200 is provided in the white light interferometry microscope 10. Note that the fifth embodiment has basically the same configuration as the configuration of the above-described embodiments except that the interference objective lens 200 different from the interference objective lens 24 of the above-described embodiments is provided. Thus, functions or components that are the same as those in the above-described embodiments will be denoted by the same reference numerals, and description thereof will be omitted.

The Mirau-type interference objective lens 200 includes an objective lens 200*a*, a beam splitter 200*b*, a reference surface 200*c*, a holder 200*d*, and a reference surface position adjustment mechanism 202. The beam splitter 200*b*, the reference surface 200*c*, and the objective lens 200*a* are arranged in this order along the Z direction upward from the surface to be measured W. In other words, the reference surface 200*c* is positioned between the objective lens 200*a* and the beam splitter 200*b*.

The objective lens 200*a* has a focusing function and focuses the measurement light L1 incident from the beam splitter 22 (see FIG. 1) on the surface to be measured W through the beam splitter 200*b*.

The beam splitter 200*b* corresponds to an interfering unit of the present invention. The beam splitter 200*b* separates part of the measurement light L1 incident from the objective lens 200*a* as the reference light L2, and emits the reference light L2 to the reference surface 24*c* on the upper side in the Z direction. Further, the beam splitter 200*b* allows the other part of the measurement light L1 to pass therethrough toward the lower side in the Z direction, and emits the other part of the measurement light L1 toward the surface to be measured W.

As the reference surface 200*c*, for example, a reflecting mirror is used, and the reference surface 200*c* reflects the reference light L2 incident from the beam splitter 200*b* on the lower side in the Z direction, toward the beam splitter 200*b*. The position of the reference surface 200*c* in the Z direction may be manually adjusted by, for example, a screw-type reference surface position adjustment mechanism 202. By this means, the reference light path length D2 between the beam splitter 200*b* and the reference surface 200*c* may be manually adjusted. This results in making it possible to make the reference light path length D2 roughly equal to the measurement light path length D1 through manual adjustment using the reference surface position adjustment mechanism 202 as in the first embodiment described above.

The beam splitter 200*b* generates the interference light L3 of the measurement light L1 returning from the surface to be measured W and the reference light L2 returning from the reference surface 200*c* and emits the interference light L3 toward the objective lens 200*a* on the upper side in the Z direction. The interference light L3 is incident on the beam splitter 22 from the objective lens 200*a*, and then, an image of the interference light L3 is captured by the camera 34 through the imaging lens 32 in a similar manner to the above-described embodiments.

The holder 200*d* is formed in a cylindrical shape extending in the Z direction with a material that can reversibly thermally deform such as brass in a similar manner to the holder 24*d* in the above-described embodiments. The holder 200*d* houses (holds) the objective lens 200*a*, the beam splitter 200*b* and the reference surface 200*c* therein. In the holder 200*d*, a part (region) where the beam splitter 200*b* and the reference surface 200*c* are housed, corresponds to the reference surface housing part 200*d*1.

The temperature adjusting unit 26 according to the fifth embodiment is provided in the vicinity of the reference surface housing part 200*d*1. The temperature adjusting unit 26 adjusts at least a temperature between the beam splitter 200*b* and the reference surface 200*c*, that is, a temperature of the reference surface housing part 200*d*1 under control of the temperature control unit 100 described above. By this means, it is possible to change the temperature of the reference surface housing part 200*d*1 so as to cause thermal deformation of the reference surface housing part 200*dl*, thereby adjusting the position of the reference surface 200*c* in the Z direction in accordance with the thermal deformation of the reference surface housing part 200*d*1. This results in making it possible to adjust the position of the reference surface 200*c* in the Z direction so that the reference light path length D2 becomes equal to the measurement light path length D1 in a similar manner to the above-described embodiments.

The temperature sensor 28 is provided in the vicinity of the reference surface housing part 200*d*1. The temperature sensor 28 measures at least the temperature of the reference surface housing part 200*d*1 in the holder 200*d* and outputs the temperature measurement result to the temperature control unit 100 (see FIG. 5). This enables the temperature control unit 100 to perform feedback control of controlling the temperature adjusting unit 26 so that the temperature of the reference surface housing part 24*d*2 is adjusted to the target temperature (temporary target temperature) based on the measurement result of the temperature sensor 28 in a similar manner to the above-described embodiments.

The heat insulating material 30 according to the fifth embodiment is provided to cover the interference objective lens 200, the temperature adjusting unit 26 and the temperature sensor 28. By this means, the temperatures of the reference surface housing part 200*d*1 and the vicinity of the reference surface housing part 200*d*1 may be made stable at the target temperature (temporary target temperature). Note that in a similar manner to the fourth embodiment illustrated in FIG. 11 described above, the heat insulating material 30A may cover only the reference surface housing part 200*d*1, the temperature adjusting unit 26 and the temperature sensor 28.

As described above, also in the fifth embodiment, the position of the reference surface 200*c* in the Z direction (reference light path length D2) may be precisely adjusted so that the reference light path length D2 becomes equal to the measurement light path length D1 by temperature control of the reference surface housing part 200*d*1 (holder 200*d*) of the Mirau-type interference objective lens 200. This results in making it possible to obtain effects similar to those in the above-described embodiments.

Sixth Embodiment

Figure 16:
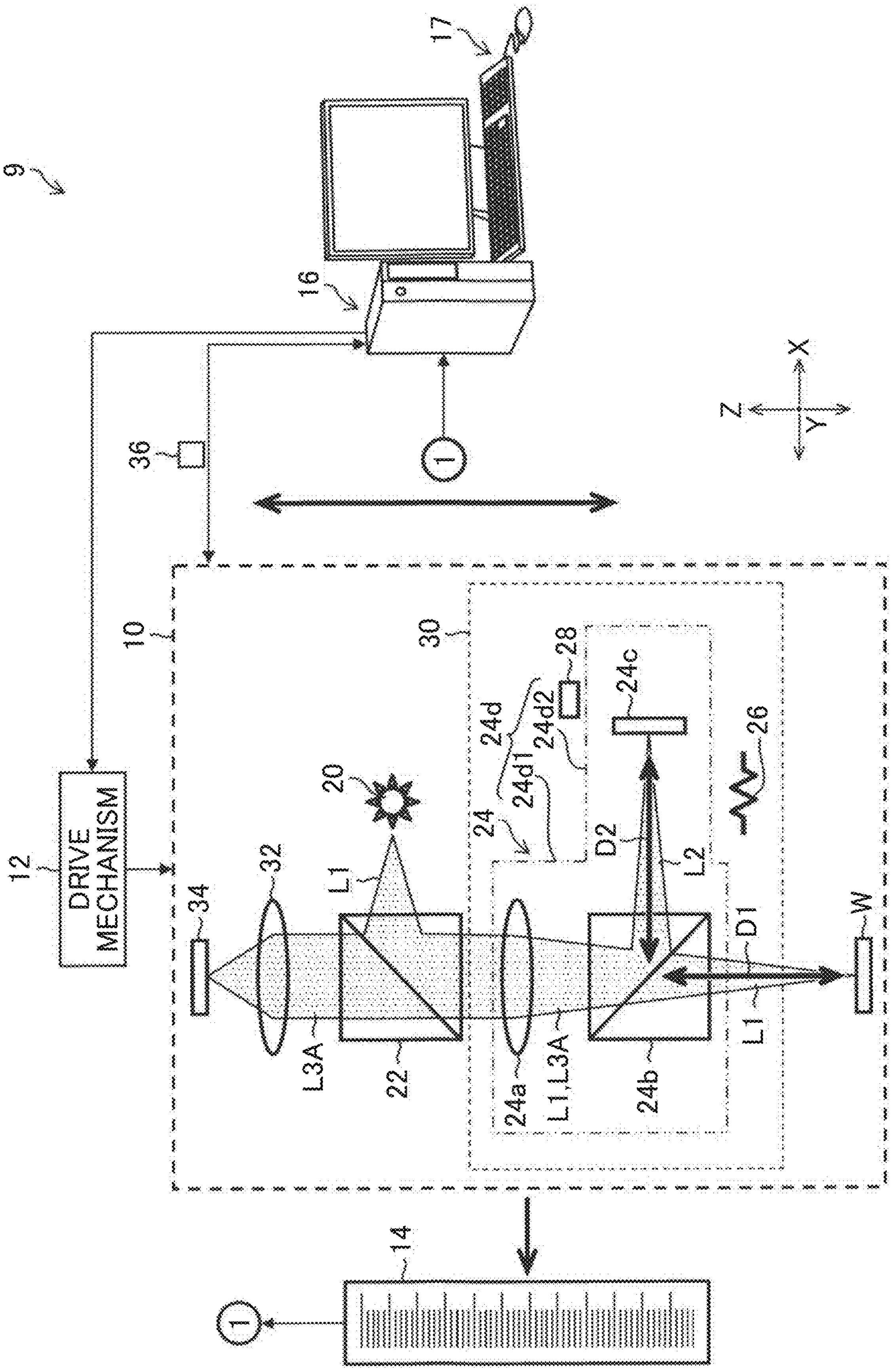
FIG. 16 is a schematic view of a three-dimensional shape measuring device of a sixth embodiment which measures a three-dimensional shape of a surface to be measured.

FIG. 16 is a schematic view of the three-dimensional shape measuring device 9 according to a sixth embodiment that measures a three-dimensional shape of the surface to be measured W. Note that X and Y directions among X, Y and Z directions perpendicular to each other in the drawing are directions parallel to the horizontal direction, and the Z direction is a direction parallel to the vertical direction.

As illustrated in FIG. 16, the three-dimensional shape measuring device 9 according to the sixth embodiment may switch between measurement of the three-dimensional shape of the surface to be measured W using the WLI system and measurement of the three-dimensional shape of the surface to be measured W using the FV system. The three-dimensional shape measuring device 9 roughly includes the white light interferometry microscope 10, the drive mechanism 12, the scale 14, the control device 16 and the operating unit 17.

The white light interferometry microscope 10 according to the sixth embodiment is a Michelson-type scanning white light interferometry microscope. The white light interferometry microscope 10 has two types of measurement modes including a WLI mode (corresponding to a first measurement mode of the present invention) corresponding to measurement of the three-dimensional shape of the surface to be measured W using the WLI system, and an FV mode (corresponding to a second measurement mode of the present invention) corresponding to measurement of the three-dimensional shape of the surface to be measured W using the FV system.

The white light interferometry microscope 10 according to the sixth embodiment is basically the same as the white light interferometry microscope 10 according to the first embodiment (see FIG. 1) described above and includes the light source unit 20, the beam splitter 22, the interference objective lens 24, the temperature adjusting unit 26, the temperature sensor 28, the heat insulating material 30, the imaging lens 32 and the camera 34.

The light source unit 20 and the beam splitter 22 according to the sixth embodiment are basically the same as the light source unit 20 and the beam splitter 22 according to the first embodiment (see FIG. 1) described above, and thus, specific description will be omitted here.

The interference objective lens 24 according to the sixth embodiment is basically the same as the interference objective lens 24 according to the first embodiment (see FIG. 1) described above and includes the objective lens 24*a*, the beam splitter 24*b*, the reference surface 24*c* and the holder 24*d*.

The objective lens 24*a* and the beam splitter 24*b* according to the sixth embodiment are basically the same as the objective lens 24*a* and the beam splitter 24*b* according to the first embodiment (see FIG. 1) described above, and thus, specific description will be omitted here.

The reference surface 24*c* according to the sixth embodiment is basically the same as the reference surface 24*c* according to the first embodiment (see FIG. 1) described above. The position of the reference surface 24*c* in the X direction may be manually adjusted using a position adjustment mechanism (not illustrated) [for example, the reference surface position adjustment mechanism 25 according to the first embodiment (see FIG. 1)]. By this means, it is possible to adjust the reference light path length D2 that is an optical path length of the reference light L2 between the beam splitter 24*b* and the reference surface 24*c*. The reference light path length D2 is adjusted so as to be equal (including roughly equal) to the measurement light path length D1 in the WLI mode.

The beam splitter 24*b* according to the sixth embodiment generates multiplexed light L3A of the measurement light L1 returning from the surface to be measured W and the reference light L2 returning from the reference surface 24*c*, and emits the multiplexed light L3A toward the objective lens 24*a* on the upper side in the Z direction. The multiplexed light L3A passes through the objective lens 24*a* and the beam splitter 22, and is incident on the imaging lens 32. While described in detail later, the multiplexed light L3A is interference light including the interference fringes during the WLI mode and is light in which generation of interference fringes is suppressed during the FV mode.

The holder 24*d* and the temperature adjusting unit 26 according to the sixth embodiment are basically the same as the holder 24*d* and the temperature adjusting unit 26 according to the first embodiment (see FIG. 1) described above, and thus, specific description will be omitted here.

The reference surface housing part 24*d*2 according to the sixth embodiment is basically the same as the reference surface housing part 24*d*2 according to the first embodiment (see FIG. 1) described above and reversibly thermally deforms (expands, shrinks) in response to temperature change. Thie makes it possible to change the temperature of the reference surface housing part 24*d*2 by the temperature adjusting unit 26 so as to cause thermal deformation of the reference surface housing part 24*d*2, thereby adjusting the position of the reference surface 24*c* in the X direction in accordance with the thermal deformation of the reference surface housing part 24*d*2. This results in making it possible to adjust the reference light path length D2 of the reference light L2 without using the reference surface position adjustment mechanism 25 (see FIG. 1), or the like, described above. Thus, the temperature adjusting unit 26 is used to switch the mode between the WLI mode and the FV mode while described in detail later.

The temperature sensor 28 according to the sixth embodiment is basically the same as the temperature sensor 28 according to the first embodiment (see FIG. 1) described above. The temperature sensor 28 measures at least a temperature of the reference surface housing part 24*d*2 (between the beam splitter 24*b* and the reference surface 24*c*), and outputs the temperature measurement result to the control device 16. The measurement result of the temperature sensor 28 is utilized to control the temperature adjusting unit 26 by the control device 16, that is, to switch the mode between the WLI mode and the FV mode.

The heat insulating material 30 and the imaging lens 32 according to the sixth embodiment are basically the same as the heat insulating material 30 and the imaging lens 32 according to the first embodiment (see FIG. 1) described above, and thus, specific description will be omitted here.

The camera 34 according to the sixth embodiment is basically the same as the camera 34 described in the first embodiment (see FIG. 1) described above. The camera 34 captures an image of the multiplexed light L3A formed on the imaging surface of the imaging element by the imaging lens 32, and performs signal processing on an imaging signal of the multiplexed light L3A obtained by the imaging, and outputs the captured image 36. While described in detail later, the captured image 36 is an image including interference fringes in the WLI mode and is an image not including interference fringes in the FV mode.

The drive mechanism 12 according to the sixth embodiment is basically the same as the drive mechanism 12 described in the first embodiment (see FIG. 1) described above. The drive mechanism 12 causes the white light interferometry microscope 10 to scan along the Z direction both in the WLI mode and the FV mode under control of the control device 16. Thus, change of the measurement light path length D1 necessary in measurement using the WLI system and movement of the focus of the camera 34 necessary in measurement using the FV system may be performed at the same time.

The scale 14 according to the sixth embodiment is basically the same as the scale 14 described in the first embodiment (see FIG. 1) described above, and thus, specific description will be omitted here.

The control device 16 according to the sixth embodiment comprehensively controls: switching of the measurement mode (WLI mode, FV mode) of the white light interferometry microscope 10 (three-dimensional shape measuring device 9); operation of measuring the three-dimensional shape of the surface to be measured W by the white light interferometry microscope 10 for each measurement mode; calculation of the three-dimensional shape of the surface to be measured W for each measurement mode; and the like, in accordance with input operation to the operating unit 17. The control device 16 includes an arithmetic circuit constituted with various kinds of processors and memories described above. Note that various kinds of functions of the control device 16 may be implemented by one processor or may be implemented by a plurality of processors of the same type or different types.

Figure 17:
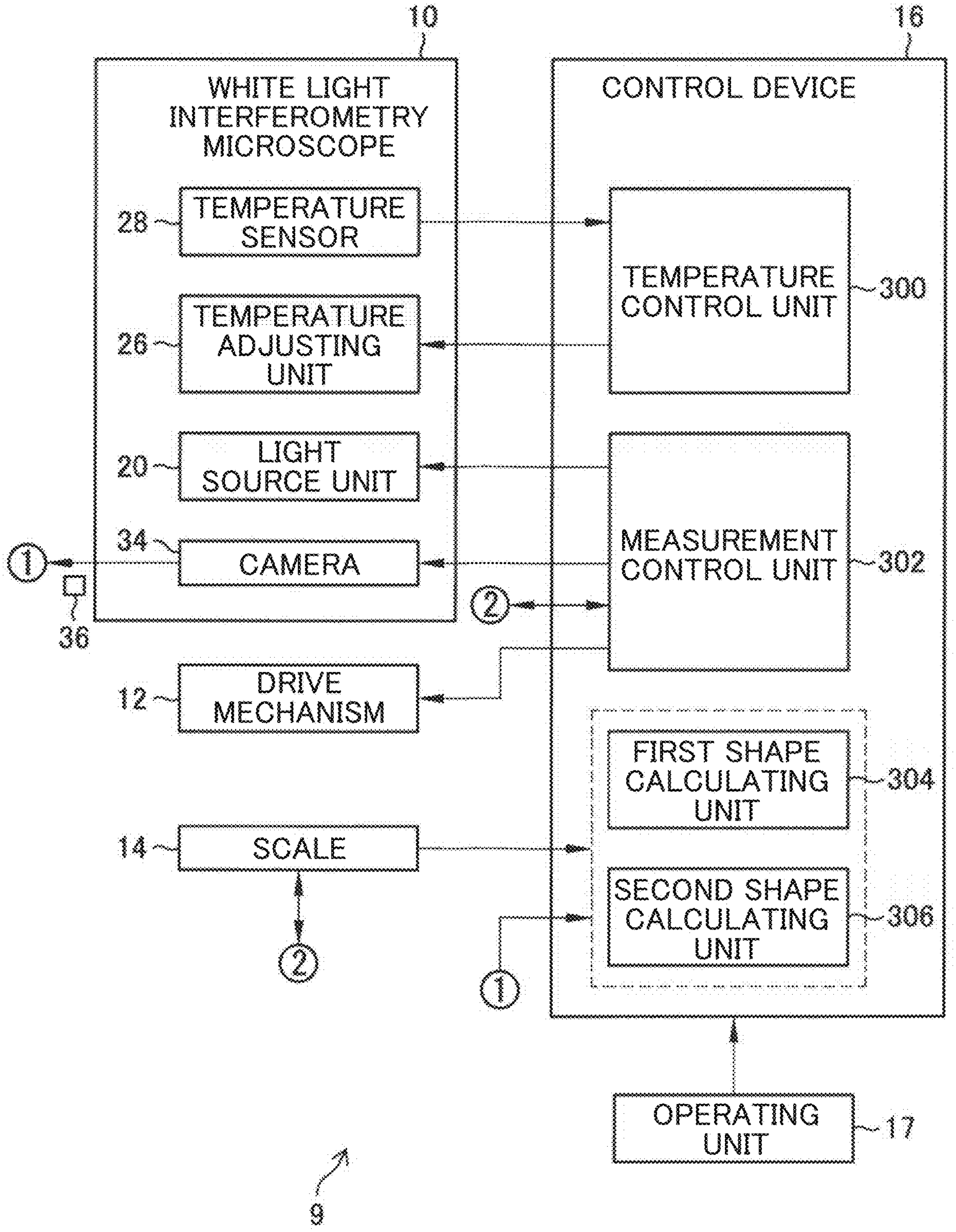
FIG. 17 is a functional block diagram of a control device according to the sixth embodiment.

FIG. 17 is a functional block diagram of the control device 16 according to the sixth embodiment. As illustrated in FIG. 17, the respective units (the light source unit 20, the temperature adjusting unit 26, the temperature sensor 28 and the camera 34) of the white light interferometry microscope 10 according to the sixth embodiment, the drive mechanism 12, the scale 14 and the operating unit 17 are connected to the control device 16.

The control device 16 according to the sixth embodiment executes a control program (not illustrated) read out of a storing unit (not illustrated), thereby functioning as the temperature control unit 300, the measurement control unit 302, the first shape calculating unit 304, and the second shape calculating unit 306.

The temperature control unit 300 switches the measurement mode of the white light interferometry microscope 10 in accordance with selection operation of the measurement mode (WLI mode, FV mode) of the white light interferometry microscope 10, which is input to the operating unit 17. Specifically, the temperature control unit 300 controls the temperature adjusting unit 26 to selectively switch the temperature of the reference surface housing part 24*d*2 between a predetermined temperature $T_{WLI}$ (° C.) corresponding to the WLI mode and a predetermined temperature $T_{FV}$ (° C.) corresponding to the FV mode. Thus, because the reference surface housing part 24*d*2 thermally deforms in accordance with each of the temperature $T_{WLI}$ and the temperature $T_{FV}$, the position of the reference surface 24*c* in the X direction changes. As a result, the reference light path length D2 is selectively switched between a length corresponding to the WLI mode and a length corresponding to the FV mode. Note that the temperature $T_{WLI}$ corresponds to a first temperature of the present invention, and the temperature $T_{FV}$ corresponds to a second temperature of the present invention.

Figure 18:
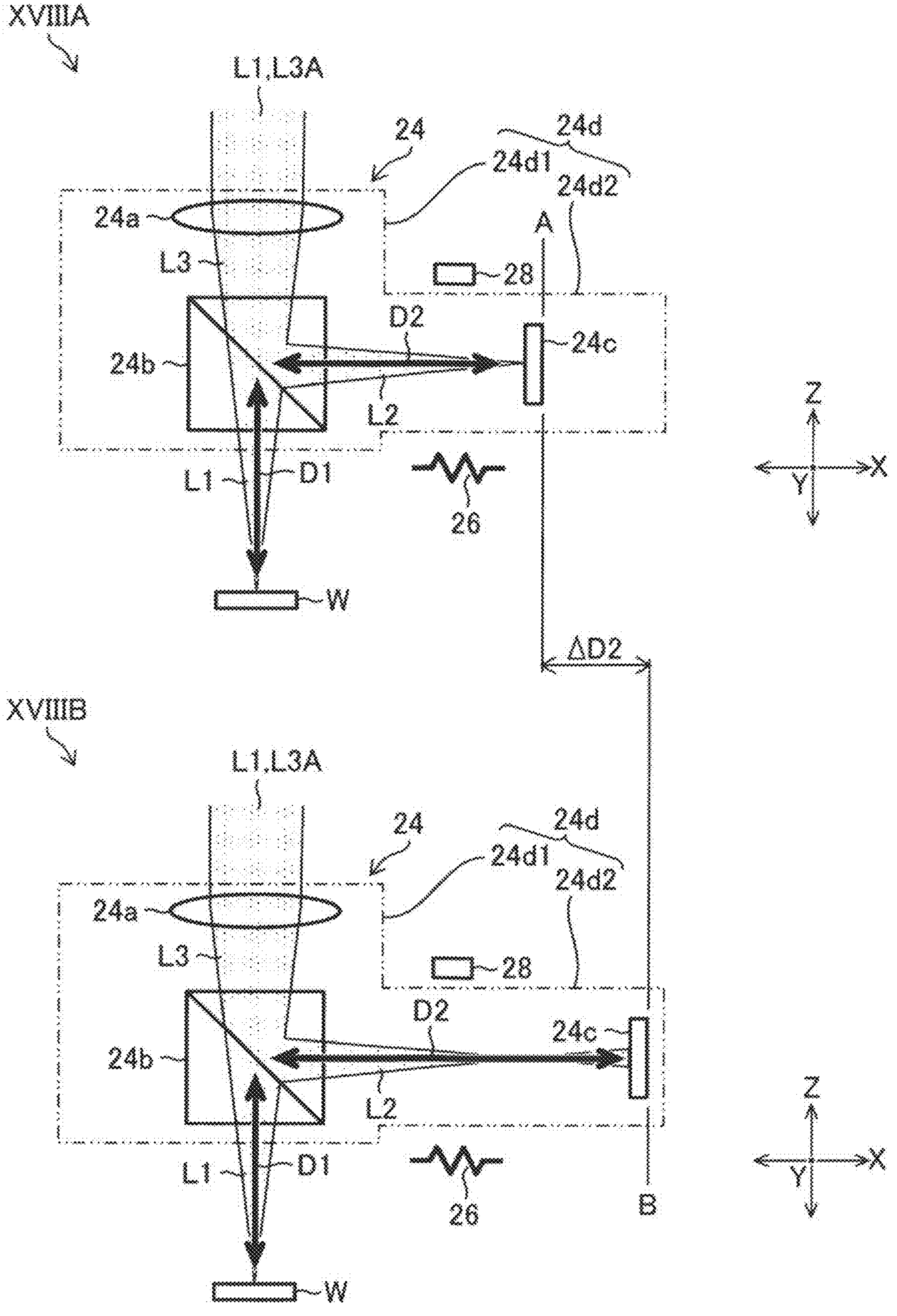
FIG. 18 is a view comparing a position of a reference surface in an X direction in a case where a temperature of the reference surface housing part is adjusted to a temperature $T_{WLI}$, and a position of the reference surface in the X direction in a case where the temperature of the reference surface housing part is adjusted to a temperature $T_{FV}$.

FIG. 18 is a view comparing the position of the reference surface 24*c* in the X direction in a case where the temperature of the reference surface housing part 24*d*2 is adjusted to the temperature $T_{WLI}$, and the position of the reference surface 24*c* in the X direction in a case where the temperature of the reference surface housing part 24*d*2 is adjusted to the temperature $T_{FV}$.

As indicated with the reference character XVIIITA in FIG. 18, the position of the reference surface 24*c* in the X direction is manually adjusted using the position adjustment mechanism (not illustrated) described above so as to match a reference position A in a case where the temperature of the reference surface housing part 24*d*2 is adjusted to the temperature $T_{WLI}$. The reference position A is a position of the reference surface 24*c* determined so that the reference light path length D2 becomes equal to the measurement light path length D1 in a state where the interference objective lens 24 is focused on the surface to be measured W.

As described above, the reference surface housing part 24*d*2 (holder 24*d*) is formed of a material that reversibly thermally deforms. Thus, adjustment of the temperature of the reference surface housing part 24*d*2 to the temperature $T_{WLI}$, may automatically adjust the position of the reference surface 24*c* in the X direction to the reference position A. As a result, the measurement light path length D1 becomes equal to the reference light path length D2 in a state where the interference objective lens 24 is focused on the surface to be measured W. By this means, in a case where the interference objective lens 24 is focused on the surface to be measured W, the measurement light L1 returning from the surface to be measured W strongly interferes with the reference light L2 returning from the reference surface 24*c* at the beam splitter 24*b*, so that the multiplexed light L3A generated at the beam splitter 24*b* becomes interference light including interference fringes. Thus, the captured image 36 (corresponding to a first image of the present invention) of the multiplexed light L3A which is output from the camera 34, also includes interference fringes, which enables measurement in the WLI system.

As indicated with reference character XVIIIB in FIG. 18, the temperature $T_{FV}$ is set so that the position of the reference surface 24*c* in the X direction in the reference surface housing part 24*d*2 matches a shift position B. The shift position B is a position of the reference surface 24*c* determined so that the reference light path length D2 becomes different from the measurement light path length D1 in a state where the interference objective lens 24 is focused on the surface to be measured W and is a position at which generation of interference fringes in the multiplexed light L3A is suppressed. Hereinafter, one example of a method for determining the temperature $T_{FV}$ will be described.

The depth of field of the objective lens 24*a* is denoted as "DOF (mm)", a linear thermal expansion coefficient of the reference surface housing part 24*d*2 is denoted as "a (/° C.)", a difference between the temperature $T_{FV}$ and the temperature $T_{WLI}$ is denoted as "ΔT", and the reference light path length D2 at the temperature $T_{WLI}$ is denoted as "d (mm)". Then, a change amount ΔD2 of the reference light path length D2 in a case where the temperature of the reference surface housing part 24*d*2 changes from the temperature $T_{WLI}$ by ΔT is expressed as the following expression 1.

$$\Delta D2 = |B - A| \times 2 = \Delta T \times \alpha \times d \qquad \text{[Math. 1]}$$

To suppress generation of interference fringes so as not to affect measurement in the FV system, it is necessary to make the change amount ΔD2 greater than a value that is N times (where N is an arbitrary natural number) of the depth of field (DOF) as indicated in the following expression 2. In other words, making the reference light path length D2 different from the measurement light path length D1 in the present invention corresponds to changing the reference light path length D2 by the change amount ΔD2 from a state where the reference light path length D2 is equal to the measurement light path length D1.

$$\Delta D2 = \Delta T \times \alpha \times d > |N \times DOF| \qquad \text{[Math. 2]}$$

In the above-described expression 2, generation of interference fringes may be suppressed so as not to affect measurement in the FV system, for example, by setting N to be equal to or greater than 2. Thus, when the above-described expression 2 is deformed, ΔT may be expressed as in the following expression 3.

$$\Delta T = |T_{FV} - T_{WLI}| > |N \times DOF/(\alpha \times d)| \qquad \text{[Math. 3]}$$

In the above-described expression 3, "DOF", "α" and "d" are known values, and "N" may be arbitrarily set. For example, assuming that a depth of field of the objective lens 24*a* in which a numerical aperture (NA) to be used at the white light interferometry microscope 10 is 0.7 is "DOF=0.56 μm", a linear thermal expansion coefficient of the reference surface housing part 24*d*2 is "$\alpha=20\times10^{-6}$", the reference light path length D2 at the temperature $T_{WLI}$ is "d=5 mm", and N is 2, the above-described expression 3 may be expressed as the following expression 4.

$$\Delta T > 2 \times (0.56 \times 10^{-3}) \times /[(20 \times 10^{-6}) \times 5] = 11.2\ (°\ C.) \qquad \text{[Math. 4]}$$

When the temperature $T_{FV}$ that satisfies the above-described expression 4 is set with respect to the temperature $T_{WLI}$, generation of interference fringes in the multiplexed light L3A may be suppressed.

As described above, the reference surface housing part 24*d*2 is formed of a material that reversibly thermally deforms. Thus, when the temperature of the reference surface housing part 24*d*2 is adjusted to the temperature $T_{FV}$, the position of the reference surface 24*c* in the X direction is automatically adjusted to the shift position B. This may suppress generation of interference fringes in the multiplexed light L3A, and thus, also suppress generation of interference fringes in the captured image 36 (corresponding to a second image of the present invention) of the multiplexed light L3A which is output from the camera 34. This results in enabling measurement in the FV system.

Figure 19:
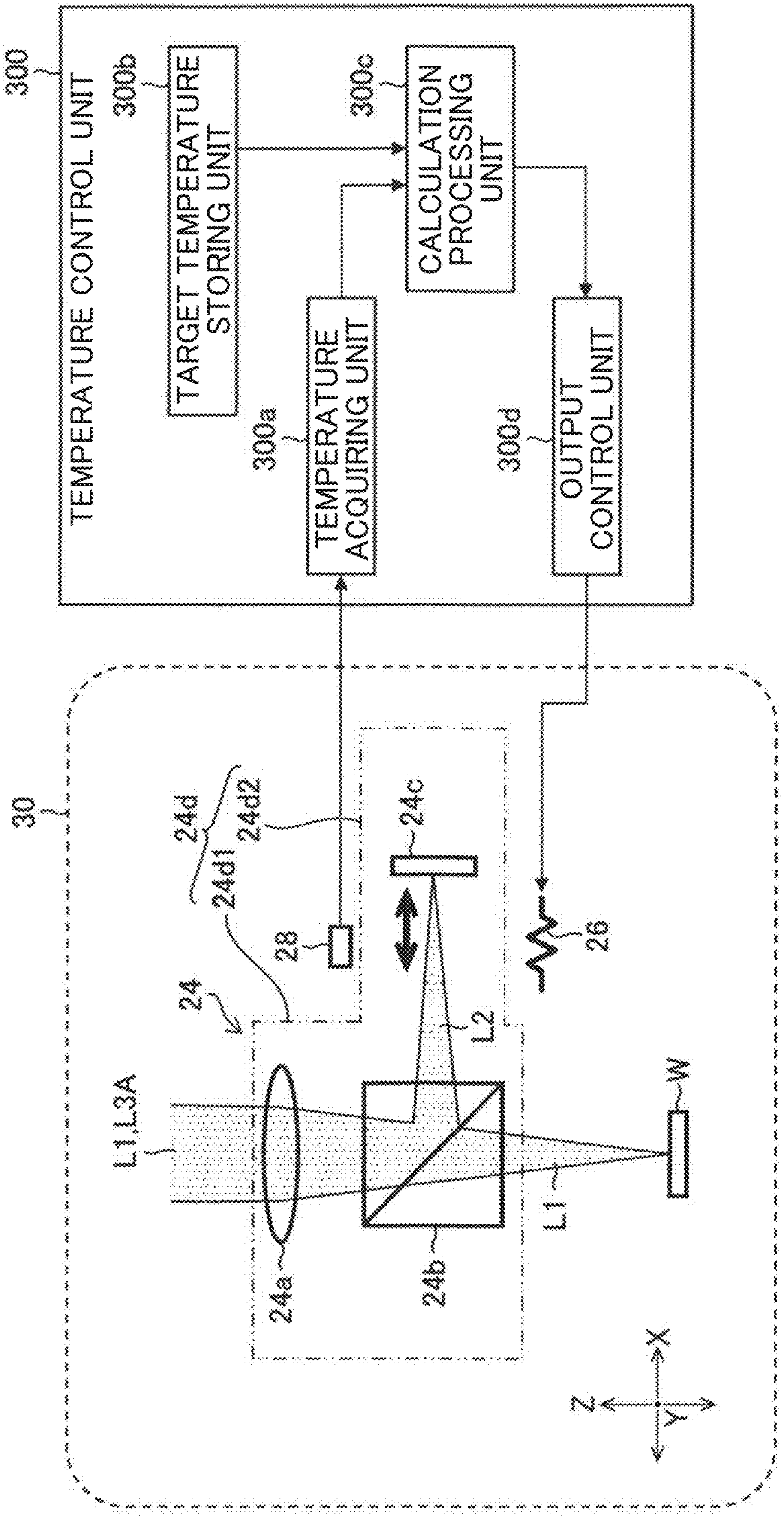
FIG. 19 is an explanatory diagram for describing temperature control of the reference surface housing part in accordance with a measurement mode by the temperature control unit.

FIG. 19 is an explanatory diagram for describing temperature control of the reference surface housing part 24*d*2 corresponding to the measurement mode by the temperature control unit 300. As illustrated in FIG. 19, the temperature control unit 300 selectively switches the temperature of the reference surface housing part 24*d*2 between the temperature $T_{WLI}$ and the temperature $T_{FV}$ in accordance with the measurement mode selected at the operating unit 17.

Specifically, the temperature control unit 300 performs feedback control of controlling the temperature adjusting unit 26 so that the temperature of the reference surface housing part 24*d*2 is adjusted to the temperature $T_{WLI}$ (during the WLI mode) or the temperature $T_{FV}$ (during the FV mode) based on the measurement result of the temperature sensor 28. Examples of the feedback control can include proportional-integral-differential (PID) control.

The temperature control unit 300 includes a temperature acquiring unit 300*a*, a target temperature storing unit 300*b*, a calculation processing unit 300*c* and an output control unit 300*d*.

The temperature acquiring unit 300*a*, which is, for example, an interface connected to the temperature sensor 28, repeatedly performs acquisition of the temperature measurement result from the temperature sensor 28 and output of the temperature measurement result to the calculation processing unit 300*c*, every time the temperature measurement result is repeatedly output from the temperature sensor 28. The target temperature storing unit 300*b* stores the temperature $T_{WLI}$ and the temperature $T_{FV}$ in advance as the target temperature. Note that the target temperature storing unit 300*b* may be provided on a server on the Internet.

The calculation processing unit 300*c* acquires the target temperature (the temperature $T_{WLI}$, the temperature $T_{FV}$) corresponding to the measurement mode (the WLI mode, the FV mode) selected at the operating unit 17 from the target temperature storing unit 300*b*. Then, every time a new temperature measurement result is input from the temperature sensor 28, the calculation processing unit 300*c* calculates a difference between the temperature measurement result and the target temperature and outputs the difference calculation result to the output control unit 300*d*.

The output control unit 300*d* performs temperature control of the temperature adjusting unit 26. The output control unit 300*d* stores, for example, a data table or an arithmetic expression that defines a relationship between the difference calculation result by the calculation processing unit 300*c* and a temperature adjustment amount by the temperature adjusting unit 26 necessary for adjusting the temperature of the reference surface housing part 24*d*2 to the target temperature. By this means, the output control unit 300*d* controls the temperature adjusting unit 26 with reference to the data table, or the like based on the difference calculation result input from the calculation processing unit 300*c* to adjust the temperature of the reference surface housing part 24*d*2 to the target temperature. In this manner, the temperature control unit 300 selectively switches the temperature of the reference surface housing part 24*d*2 between the temperature $T_{WLI}$ and the temperature Try in accordance with the measurement mode selected at the operating unit 17, so as to selectively switch the position of the reference surface 24*c* in the X direction between the reference position A and the shift position B. This results in making it possible for the temperature control unit 300 to selectively switch the measurement mode of the white light interferometry microscope 10 between the WLI mode and the FV mode.

Returning to FIG. 17, the measurement control unit 302 controls the drive mechanism 12, the light source unit 20 and the camera 34 to measure the three-dimensional shape of the surface to be measured W in accordance with the measurement mode (the WLI mode, the FV mode) selected at the operating unit 17.

Specifically, the measurement control unit 302 controls the drive mechanism 12 to cause the white light interferometry microscope 10 to scan in the Z direction after emission of the measurement light L1 from the light source unit 20 is started. Further, the measurement control unit 302 causes the camera 34 to repeatedly capture the image of the multiplexed light L3A and output the captured image 36 to the control device 16 every time the white light interferometry microscope 10 moves in the Z direction by a fixed pitch based on the detection result of the position of the white light interferometry microscope 10 in the Z direction by the scale 14, while the drive mechanism 12 causes the white light interferometry microscope 10 to scan in the Z direction. Note that the above-described pitch during the FV mode may be the same as the pitch during the WLI mode or may be set wider than the pitch during the WLI mode.

The captured image 36 for each pitch described above is input to the first shape calculating unit 304 during the WLI mode and input to the second shape calculating unit 306 during the FV mode.

The first shape calculating unit 304 calculates the three-dimensional shape of the surface to be measured W using a method (see FIG. 20) similar to the method used in the shape calculating unit 104 in the above-described embodiments during the WLI mode.

Figure 20:
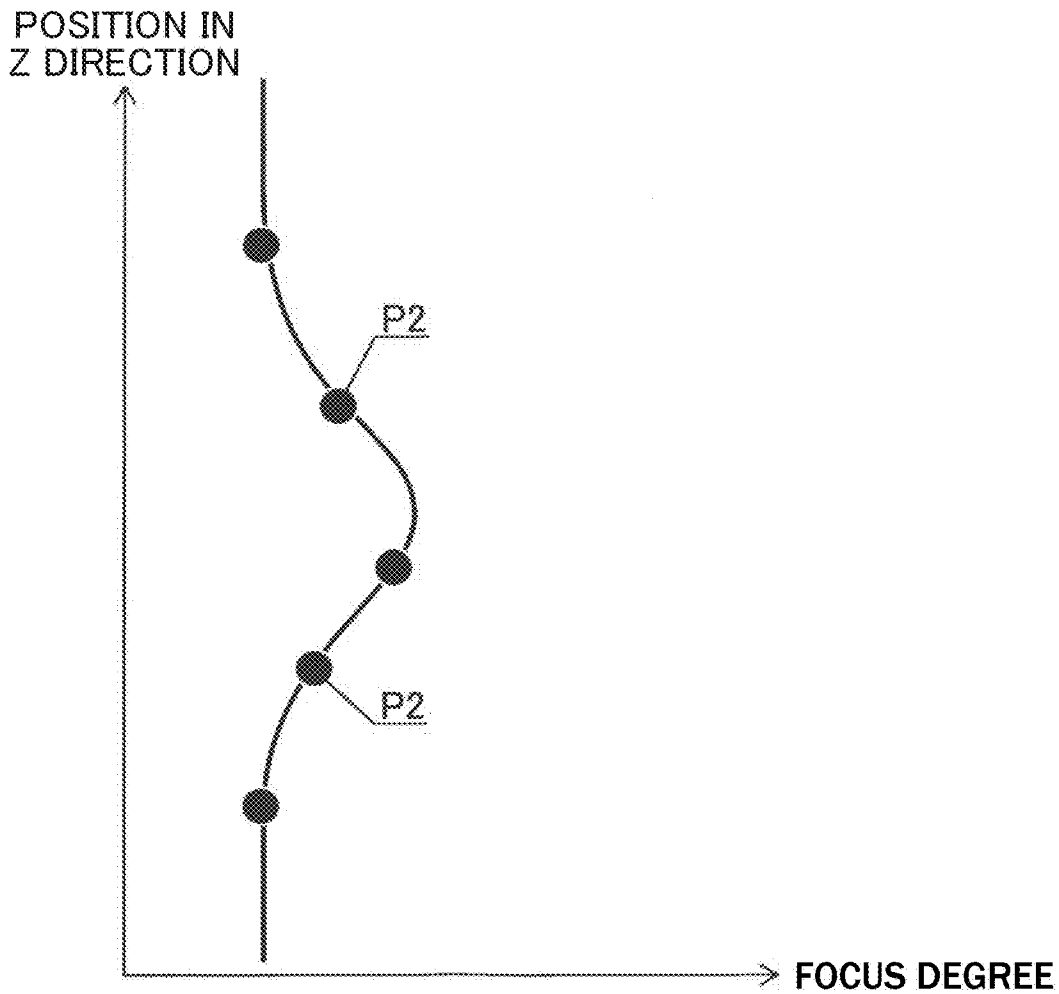
FIG. 20 is an explanatory diagram for describing calculation of a three-dimensional shape of a surface to be measured by a second shape calculating unit.

FIG. 20 is an explanatory diagram for describing calculation of the three-dimensional shape of the surface to be measured W by the second shape calculating unit 306. The second shape calculating unit 306 calculates the three-dimensional shape of the surface to be measured W during the FV mode. The second shape calculating unit 306 acquires the captured image 36 input from the camera 34 via an image acquiring unit (not illustrated) every time the white light interferometry microscope 10 moves by a fixed pitch.

Then, the second shape calculating unit 306 calculates focus degree (contrast value) for each pixel of each captured image 36 (the imaging element of the camera 34) in which generation of interference fringes is suppressed. Then, as indicated in FIG. 20, the second shape calculating unit 306 compares the focus degree (see a reference numeral P2) for each pixel on the same coordinate in the respective captured images 36. Here, FIG. 20 illustrates a relationship between the focus degree and the position in the Z direction, for one arbitrary pixel. The second shape calculating unit 306 determines a focus position of the camera 34 with respect to the surface to be measured W for each pixel on the same coordinate by determining a position in the Z direction at which the focus degree becomes maximum for each pixel on the same coordinate. By this means, the three-dimensional shape of the surface to be measured W is obtained. Note that calculation of the three-dimensional shape of the surface to be measured W in the FV mode is also a publicly known technique (see Patent Literature 1 described above), and thus, detailed description will be omitted here.

Operation of Sixth Embodiment

Figure 21:
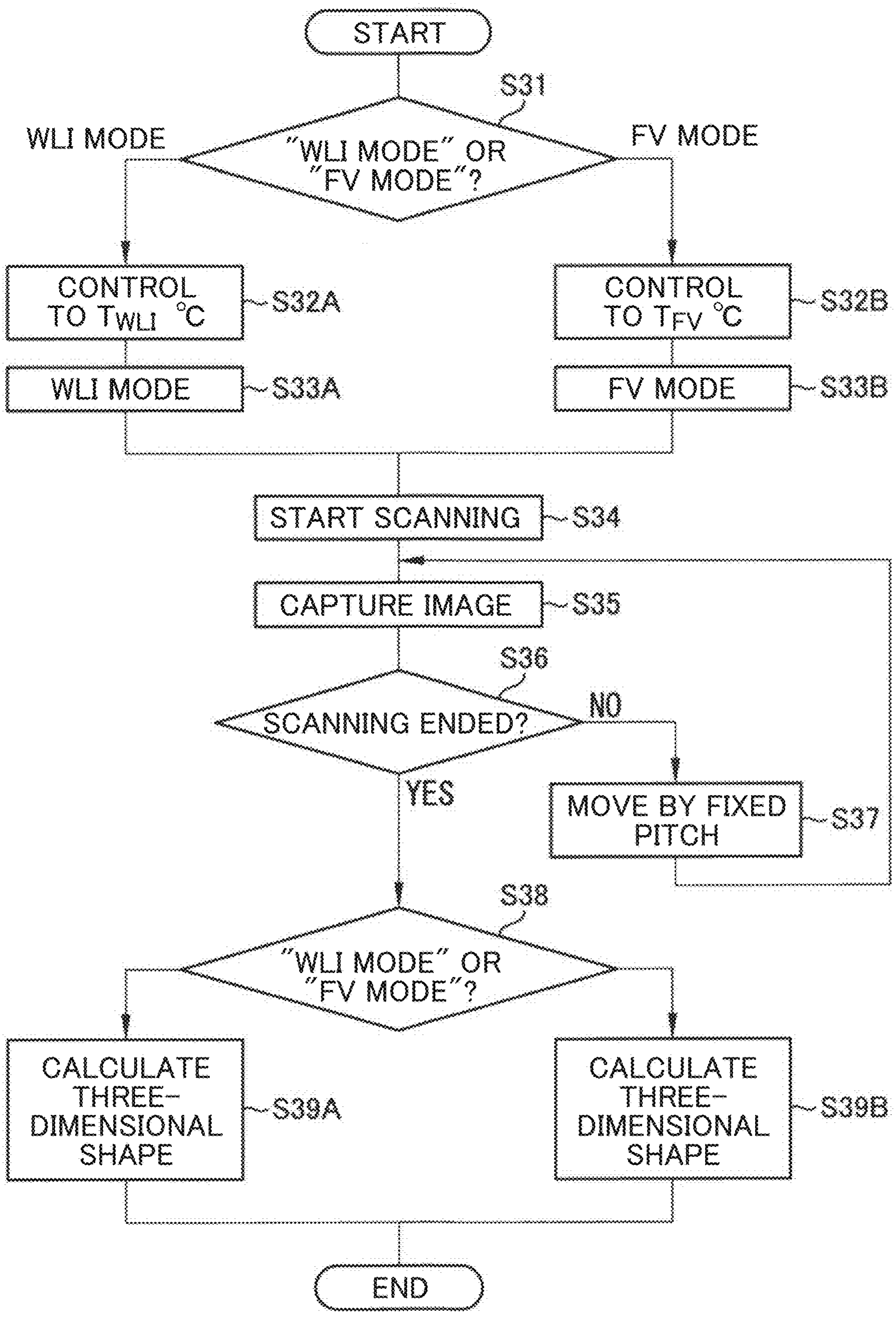
FIG. 21 is a flowchart indicating flow of processing of measuring a three-dimensional shape of a surface to be measured by the three-dimensional shape measuring device according to the sixth embodiment.

FIG. 21 is a flowchart indicating flow of processing of measuring the three-dimensional shape of the surface to be measured W by the three-dimensional shape measuring device 9 according to the sixth embodiment having the above-described configuration (corresponding to a method for switching a measurement mode of the present invention). Here, it is assumed that the measurement control unit 302 causes the light source unit 20 to start emission of the measurement light L1, and the temperature sensor 28 starts measurement of the temperature of the reference surface housing part 24*d*2 and repeatedly outputs the temperature measurement result to the temperature acquiring unit 300*a* of the temperature control unit 300.

As indicated in FIG. 21, the operator determines one of the WLI mode and the FV mode, as the measurement mode of the white light interferometry microscope 10, in accordance with a type (a flat surface, an inclined surface) of the surface to be measured W and measurement content (measurement of a surface roughness shape, measurement of a shape) and operates the operating unit 17 to perform operation of selecting the measurement mode (step S31). For example, the operator performs operation of selecting the WLI mode using the operating unit 17 in a case where a surface roughness shape of the surface to be measured W is measured, whereas the operator performs operation of selecting the FV mode using the operating unit 17 in a case where the surface to be measured W is an inclined surface or to measure a shape of the surface to be measured W.

In a case where the operation of selecting the WLI mode is performed, the calculation processing unit 300*c* of the temperature control unit 300 acquires information on the temperature $T_{WLI}$ as the target temperature from the target temperature storing unit 300*b*. Then, every time a new temperature measurement result is input from the temperature sensor 28, the calculation processing unit 300*c* calculates a difference between the temperature measurement result and the temperature $T_{WLI}$, and outputs the difference calculation result to the output control unit 300*d*. Then, the output control unit 300*d* controls the temperature adjusting unit 26 based on the difference calculation result to thereby adjust the temperature of the reference surface housing part 24*d*2 to the temperature $T_{WLI}$ (step S32A).

In this event, in the present embodiment, the interference objective lens 24, the temperature adjusting unit 26 and the temperature sensor 28 are covered with the heat insulating material 30, so that it is possible to make the temperature inside the heat insulating material 30, particularly, the temperatures of the reference surface housing part 24*d*2 and the vicinity of the reference surface housing part 24*d*2 stable at the temperature $T_{WLI}$.

In a case where the temperature of the reference surface housing part 24*d*2 is adjusted to the temperature $T_{WLI}$, as indicated with the reference character XVIIIA in FIG. 18 described above, the reference surface housing part 24*d*2 thermally deforms so that the position of the reference surface 24*c* in the X direction matches the reference position A. In this event, the temperature of the reference surface housing part 24*d*2 is made stable at the temperature $T_{WLI}$ by the heat insulating material 30, so that it is possible to adjust the position of the reference surface 24*c* in the X direction to the reference position A with high accuracy.

In this manner, by controlling the temperature of the reference surface housing part 24*d*2 that can reversibly thermally deform, it is possible to align the position of the reference surface 24*c* in the X direction to the reference position A with better reproducibility, compared to a case where the position of the reference surface 24*c* in the X direction is manually adjusted using a position adjustment mechanism (not illustrated). Further, the position of the reference surface 24*c* in the X direction may be adjusted at lower cost than in a case where a highly accurate automatic position adjustment mechanism having resolution of several tens of nanometers is provided.

Because the position of the reference surface 24*c* in the X direction is adjusted to the reference position A, the reference light path length D2 becomes equal to the measurement light path length D1 in a state where the interference objective lens 24 is focused on the surface to be measured W. Thus, interference fringes are included in the multiplexed light L3A generated at the beam splitter 24*b*. By this means, the mode of the white light interferometry microscope 10 is switched to the WLI mode (step S33A).

On the other hand, in a case where the operation of selecting the FV mode is performed, the calculation processing unit 300*c* of the temperature control unit 300 acquires information on the temperature $T_{FV}$ as the target temperature from the target temperature storing unit 300*b*. Hereinafter, in a similar manner to a case where the WLI mode is selected, the difference calculation by the calculation processing unit 300*c* and control of the temperature adjusting unit 26 by the output control unit 300*d* are executed, so that the temperature of the reference surface housing part 24*d*2 is adjusted to the temperature $T_{FV}$ (step S32B). Further, as described above, the interference objective lens 24, and the like, are covered with the heat insulating material 30, so that it is possible to make the temperatures of the reference surface housing part 24*d*2 and the vicinity of the reference surface housing part 24*d*2 stable at the temperature $T_{FV}$.

In a case where the temperature of the reference surface housing part 24*d*2 is adjusted to the temperature $T_{FV}$, as indicated with the reference characters XVIIIB in FIG. 18 described above, the reference surface housing part 24*d*2 thermally deforms so that the position of the reference surface 24*c* in the X direction matches the shift position B. In this event, the temperature of the reference surface housing part 24*d*2 is made stable at the temperature Try by the heat insulating material 30, so that it is possible to adjust the position of the reference surface 24*c* in the X direction to the shift position B with high accuracy. By this means, it is possible to align the position of the reference surface 24*c* in the X direction to the shift position B with better reproducibility than in a case where the position of the reference surface 24*c* in the X direction is manually adjusted. Further, the better reproducibility may be achieved at lower cost than in a case where a highly accurate automatic position adjustment mechanism is used.

Because the position of the reference surface 24*c* in the X direction is adjusted to the shift position B, the reference light path length D2 becomes a length different from the measurement light path length D1 in a state where the interference objective lens 24 is focused on the surface to be measured W. Thus, it is possible to suppress generation of interference fringes in the multiplexed light L3A generated at the beam splitter 24*b*. As a result, the mode of the white light interferometry microscope 10 is switched to the FV mode (step S33B).

In a case where switching of the measurement mode of the white light interferometry microscope 10 is completed, the measurement control unit 302 controls the drive mechanism 12 to cause the white light interferometry microscope 10 to scan in the Z direction (step S34). Then, the measurement control unit 302 causes the camera 34 to repeatedly capture the image of the multiplexed light L3A every time the white light interferometry microscope 10 moves in the Z direction by a fixed pitch based on the detection result of the position of the white light interferometry microscope 10 in the Z direction by the scale 14 (step S35, step S36: No, step S37). In a case where the measurement mode is the WLI mode, the captured image 36 in which interference fringes are generated is sequentially input from the camera 34 to the first shape calculating unit 304. On the other hand, in a case where the measurement mode is the FV mode, the captured image 36 in which generation of interference fringes is suppressed is sequentially input from the camera 34 to the second shape calculating unit 306.

Note that in the FV mode, the pitch may be made wider than that in the WLI mode, so that it is possible to shorten a measurement period. Further, inversely, in the WLI mode, the above-described pitch is narrower than that in the FV mode, and thus, vertical resolution of measurement of the three-dimensional shape of the surface to be measured W becomes high.

If scanning of the white light interferometry microscope 10 ends (step S36: Yes), the first shape calculating unit 304 or the second shape calculating unit 306 operates in accordance with the measurement mode (step S38).

In a case where the measurement mode is the WLI mode, the first shape calculating unit 304 detects luminance values for each pixel in the respective captured images 36 in which interference fringes are generated, and determines a position in the Z direction at which the luminance value becomes maximum for each pixel on the same coordinate of the respective captured images 36, thereby calculating height information of the surface to be measured W for each pixel on the same coordinate. By this means, the three-dimensional shape of the surface to be measured W is calculated by the first shape calculating unit 304 (step S39A).

On the other hand, in a case where the measurement mode is the FV mode, the second shape calculating unit 306 calculates focus degree for each pixel in the respective captured images 36 in which generation of interference fringes is suppressed, and determines a position in the Z direction at which the focus degree becomes maximum for each pixel on the same coordinate of the respective captured images 36, thereby determining a focal position of the camera 34 with respect to the surface to be measured W for each pixel on the same coordinate. By this means, the three-dimensional shape of the surface to be measured W is calculated by the second shape calculating unit 306 (step S39B).

As described above, in the sixth embodiment, through the temperature control of the reference surface housing part 24*d*2 that may reversibly thermally deform, the position of the reference surface 24*c* in the X direction may be moved between the reference position A and the shift position B with favorable reproducibility. This makes it possible to switch the measurement mode of the white light interferometry microscope 10 without replacing the interference objective lens 24 or manually adjusting the position of the reference surface 24*c* in the X direction. As a result, it is not necessary to prepare a plurality of types of interference objective lenses 24 in accordance with types of the measurement mode, or prepare a mechanism for switching the interference objective lens 24 or provide a highly accurate position adjustment mechanism of the reference surface 24*c*. Thus, it is possible to achieve cost reduction. Further, it is possible to prevent occurrence of a problem that measurement accuracy of the three-dimensional shape of the surface to be measured W degrades due to attachment and removal of the interference objective lens 24.

Seventh Embodiment

Figure 22:
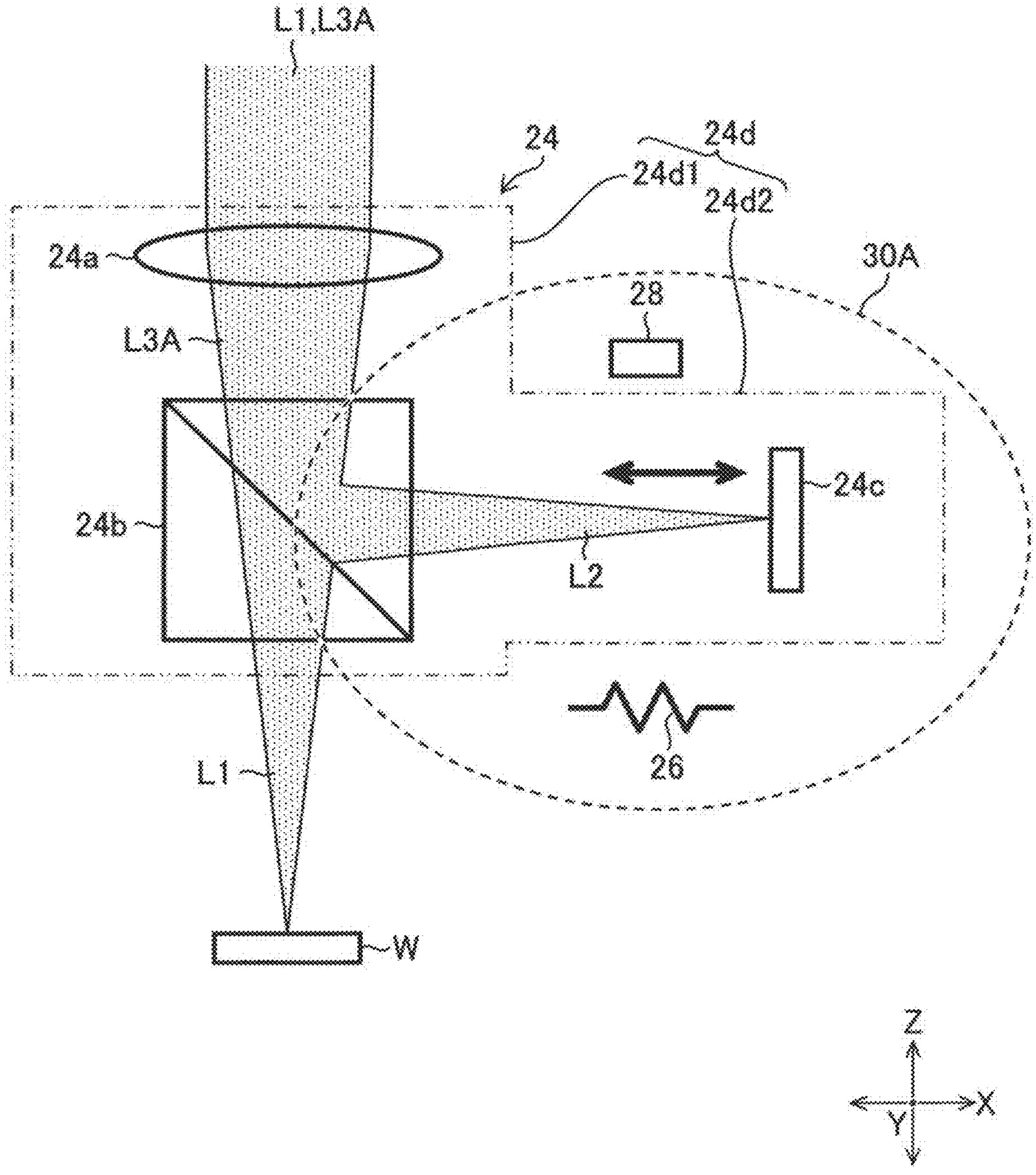
FIG. 22 is an enlarged view of an interference objective lens and a heat insulating material of a white light interferometry microscope of a three-dimensional shape measuring device according to a seventh embodiment.

FIG. 22 is an enlarged view of the interference objective lens 24 and the heat insulating material 30A of the white light interferometry microscope 10 of the three-dimensional shape measuring device 9 according to a seventh embodiment.

While in the sixth embodiment described above, the heat insulating material 30 covers the whole of the interference objective lens 24, the temperature adjusting unit 26 and the temperature sensor 28, as illustrated in FIG. 22, in the seventh embodiment, the heat insulating material 30A which is similar to that in the fourth embodiment (see FIG. 11) described above covers only the reference surface housing part 24*d*2, the temperature adjusting unit 26 and the temperature sensor 28. Note that the seventh embodiment has basically the same configuration as that in the sixth embodiment except that the heat insulating material 30A different from the heat insulating material 30 in the sixth embodiment described above is provided. Thus, functions or components that are the same as those in the sixth embodiment described above will be denoted by the same reference numerals, and description thereof will be omitted.

In this manner, because the heat insulating material 30A coves the reference surface housing part 24*d*2, the temperature adjusting unit 26, and the temperature sensor 28, the temperatures of the reference surface housing part 24*d*2 and the vicinity of the reference surface housing part 24*d*2 may be made stable at the target temperature (the temperature $T_{WLI}$, the temperature $T_{FV}$) in a similar manner to the sixth embodiment described above. Further, because occurrence of aberration of the objective lens 24*a* due to heat generated at the temperature adjusting unit 26 may be minimized, measurement of the three-dimensional shape of the surface to be measured W is made tolerant to temperature change. This results in making it possible to measure the three-dimensional shape of the surface to be measured W with further high accuracy and reliability.

Eighth Embodiment

Figure 23:
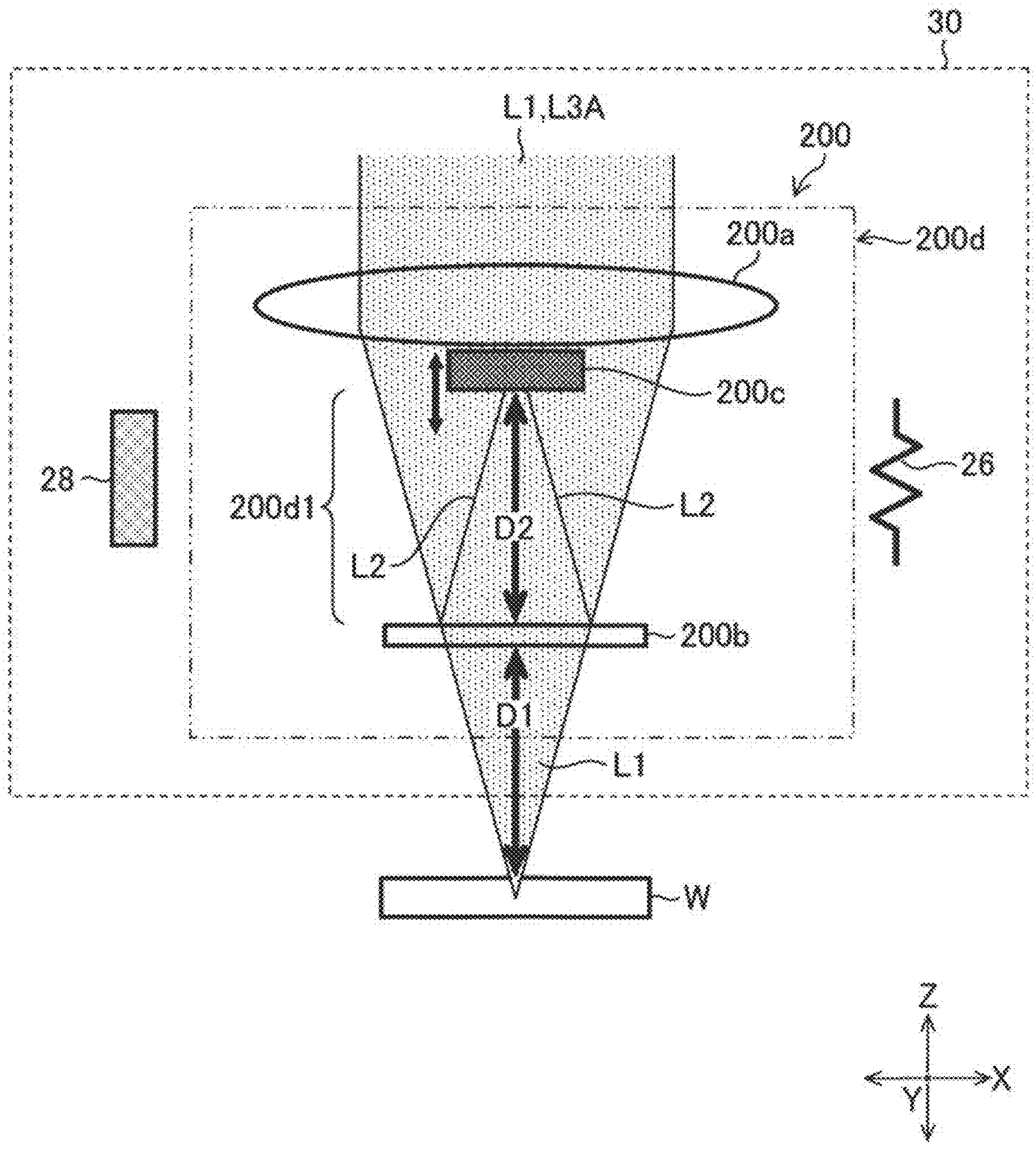
FIG. 23 is an enlarged view of an interference objective lens of a white light interferometry microscope of a three-dimensional shape measuring device according to an eighth embodiment.

FIG. 23 is an enlarged view of the interference objective lens 200 of the white light interferometry microscope 10 of the three-dimensional shape measuring device 9 according to an eighth embodiment.

While in the above-described embodiments, a Michelson-type interference objective lens 24 is provided in the white light interferometry microscope 10, as illustrated in FIG. 23, in the eighth embodiment, a Mirau-type interference objective lens 200 is provided in the white light interferometry microscope 10 in a similar manner to the fifth embodiment (see FIG. 12) described above. Note that the eighth embodiment has basically the same configuration as that in the above-described sixth embodiment and the above-described seventh embodiment except that the interference objective lens 200 different from the interference objective lens 24 of the above-described embodiments is provided. Thus, functions or components that are the same as those in the above-described sixth embodiment and the above-described seventh embodiment will be denoted by the same reference numerals, and description thereof will be omitted.

The Mirau-type interference objective lens 200 of the eighth embodiment includes the objective lens 200*a*, the beam splitter 200*b*, the reference surface 200*c* and the holder 200*d*.

The objective lens 200*a* and the beam splitter 200*b* in the eighth embodiment are basically the same as the objective lens 200*a* and the beam splitter 200*b* in the above-described fifth embodiment (see FIG. 12), and thus, specific description will be omitted here.

The reference surface 200*c* in the eighth embodiment is basically the same as the reference surface 200*c* in the fifth embodiment (see FIG. 12). The position of the reference surface 200*c* in the Z direction can be manually adjusted using a position adjustment mechanism (not illustrated). This makes it possible to adjust the reference light path length D2 between the beam splitter 200*b* and the reference surface 200*c*. The reference light path length D2 is adjusted to be equal to the measurement light path length D1 between the beam splitter 200*b* and the surface to be measured W during the WLI mode.

The beam splitter 200*b* in the eighth embodiment generates the multiplexed light L3A of the measurement light L1 returning from the surface to be measured W and the reference light L2 returning from the reference surface 200*c*, and emits the multiplexed light L3A toward the objective lens 200*a* on the upper side in the Z direction. The multiplexed light L3A is incident on the beam splitter 22 from the objective lens 200*a*, and an image of the multiplexed light L3A is captured by the camera 34 through the imaging lens 32 in a similar manner to the above-described sixth embodiment and the above-described seventh embodiment.

The holder 200*d* in the eighth embodiment is basically the same as the holder 200*d* in the fifth embodiment (see FIG. 12), and thus, specific description will be omitted here.

The temperature adjusting unit 26 in the eighth embodiment is basically the same as the temperature adjusting unit 26 in the fifth embodiment (see FIG. 12), and adjusts the temperature of the reference surface housing part 200*dl*. By this means, it is possible to thermally deform the reference surface housing part 200*d*1 so as to adjust the position of the reference surface 200*c* in the Z direction in accordance with the thermal deformation. This results in making it possible to adjust the position of the reference surface 200*c* in the Z direction to the reference position A (not illustrated) at which the reference light path length D2 is equal to the measurement light path length D1, or to the shift position B (not illustrated) at which the reference light path length D2 is not equal to the measurement light path length D1. Thus, the reference light path length D2 is adjustable in a similar manner to the above-described embodiments, so that the measurement mode of the white light interferometry microscope 10 may be selectively switched between the WLI mode and the FV mode.

The temperature sensor 28 of the eighth embodiment, which is basically the same as the temperature sensor 28 of the above-described fifth embodiment (see FIG. 12), measures at least the temperature of the reference surface housing part 200*d*1 in the holder 200*d* and output the temperature measurement result to the temperature control unit 300 (see FIG. 19). By this means, in a similar manner to the above-described embodiments, the temperature control unit 300 may perform feedback control of controlling the temperature adjusting unit 26 so that the temperature of the reference surface housing part 24*d*2 is adjusted to the target temperature (temperature $T_{WLI}$, the temperature $T_{FV}$) based on the measurement result of the temperature sensor 28.

The heat insulating material 30 in the eighth embodiment is provided so as to cover the interference objective lens 200, the temperature adjusting unit 26, and the temperature sensor 28 in a similar manner to the heat insulating material 30 in the fifth embodiment (see FIG. 12). By this means, the temperatures of the reference surface housing part 200*dl* and the vicinity of the reference surface housing part 200*d*1 may be made stable at the target temperature (the temperature $T_{WLI}$, the temperature $T_{FV}$). Note that in a similar manner to the seventh embodiment illustrated in FIG. 22 described above, the heat insulating material 30A may cover only the reference surface housing part 200*dl*, the temperature adjusting unit 26 and the temperature sensor 28.

As described above, also in the eighth embodiment, through temperature control of the reference surface housing part 200*d*1 (holder 200*d*) of the Mirau-type interference objective lens 200, the position of the reference surface 200*c* in the Z direction may be moved to the reference position A and the shift position B with better reproducibility. Thus, it is possible to switch the measurement mode of the white light interferometry microscope 10 in a similar manner to the above-described embodiments. As a result, effects similar to those in the above-described embodiments may be obtained.

Here, as a method for switching the measurement mode of the white light interferometry microscope 10, for example, in a case where the Michelson-type interference objective lens 24 is used, the measurement mode may be switched between the FV mode and the WLI mode by inserting and removing a shutter on the optical path of the reference light L2. However, in a case of the Mirau-type interference objective lens 200, if a shutter is inserted on the optical path of the reference light L2, the measurement light L1 is also blocked by the shutter, and thus, measurement cannot be performed in the FV mode. Therefore, in a case where the Mirau-type interference objective lens 200 is provided as in the white light interferometry microscope 10 according to the eighth embodiment, it is effective to switch the measurement mode by temperature control of the reference surface housing part 200*d*1 (holder 200*d*).

Others

In the above-described embodiments, a case has been described as an example where the Michelson-type interference objective lens 24 or the Mirau-type interference objective lens 200 is provided in the white light interferometry microscope 10. However, for example, various kinds of publicly known interference objective lenses such as a Linic type may be provided. Further, the respective units (the objective lens 24*a*, 200*a*, the beam splitter 24*b*, 200*b*, the reference surface 24*c*, 200*c*) of the interference objective lens 24 may be separately provided.

While in the above-described embodiments, the drive mechanism 12 causes the white light interferometry microscope 10 to scan in the Z direction, a scanning target is not particularly limited if at least the interference objective lens 24, 200 and the camera 34 can be caused to scan in the Z direction.

REFERENCE SIGNS LIST

9 Three-dimensional shape measuring device
10 White light interferometry microscope
12 Drive mechanism
14 Scale
16 Control device
17 Operating unit
20 Light source unit
22 Beam splitter
23 Adapter part
24 Interference objective lens
24*a* Objective lens
24*b* Beam splitter
24*c* Reference surface
24*d* Holder
24*d*1 Lens barrel
24*d*2 Reference surface housing part
25 Reference surface position adjustment mechanism
26 Temperature adjusting unit
28 Temperature sensor
30 Heat insulating material
30A Heat insulating material
32 Imaging lens
34 Camera
36 Captured image
98 Focusing control unit
99 Test pattern
100 Temperature control unit
100*a* Temperature acquiring unit
100*b* Target temperature storing unit
100*c* Calculation processing unit
100*d* Output control unit
100*e* Temperature change control unit
100*f* Image acquiring unit
100*g* Target temperature determining unit
100*h* Lens system distinguishing unit
100*i* Target temperature acquiring unit
101 Interference fringe
102 Measurement control unit
104 Shape calculating unit

110 Lens system
112 Database
200 Interference objective lens
200*a* Objective lens
200*b* Beam splitter
200*c* Reference surface
200*d* Holder
200*d*1 Reference surface housing part
202 Reference surface position adjustment mechanism
300 Temperature control unit
300*a* Temperature acquiring unit
300*b* Target temperature storing unit
300*c* Calculation processing unit
300*d* Output control unit
302 Measurement control unit
304 First shape calculating unit
306 Second shape calculating unit
500 Interference objective lens
501 Interfering unit
502 Reference surface
504 Objective lens
506 Holder
D1 Measurement light path length
D2 Reference light path length
L1 Measurement light
L2 Reference light
L3 Interference light
W Surface to be measured
A Reference position
B Shift position
L3A Multiplexed light
$T_{FV}$ Temperature
$T_{WLI}$ Temperature
W Surface to be measured
ΔD2 Change amount

What is claimed is:

1. A three-dimensional shape measuring device comprising:

a light source unit configured to emit measurement light that is white light;

an interfering unit configured to: separate as reference light, part of the measurement light emitted from the light source unit to emit the measurement light to a surface to be measured and emit the reference light to a reference surface; and generate interference light of the measurement light returning from the surface to be measured and the reference light returning from the reference surface;

a holder configured to house the interfering unit and the reference surface, wherein the holder is formed of a material that reversibly thermally deforms in response to temperature change and causes a reference light path length which is an optical path length of the reference light between the interfering unit and the reference surface, to change in response to the temperature change; and a temperature adjusting unit configured to adjust, in a case where an optical path length of the measurement light between the interfering unit and the surface to be measured is set as a measurement light path length, a temperature of the holder to a target temperature at which the reference light path length becomes equal to the measurement light path length.

2. The three-dimensional shape measuring device according to claim 1, comprising:

a temperature measuring unit configured to measure the temperature of the holder;

an objective lens configured to cause the measurement light to focus on the surface to be measured;

a camera configured to capture an image of the interference light generated by the interfering unit;

a temporary target temperature control unit configured to control the temperature adjusting unit to adjust the temperature of the holder to a temporary target temperature determined in advance;

a focusing control unit configured to focus the objective lens on the surface to be measured;

a reference surface position adjustment mechanism configured to accept manual adjustment of a position of the reference surface and makes the reference light path length roughly equal to the measurement light path length in a state where the temperature of the holder is adjusted to the temporary target temperature, and the objective lens is focused on the surface to be measured;

a temperature change control unit configured to control the temperature adjusting unit to change the temperature of the holder in a state where the reference light path length is roughly equal to the measurement light path length;

an image acquiring unit configured to cause the camera to repeatedly capture the image of the interference light to acquire images from the camera while the temperature change control unit changes the temperature of the holder;

a temperature acquiring unit configured to acquire a temperature measurement result by the temperature measuring unit every time the camera captures the image of the interference light; and a target temperature determining unit configured to determine a temperature at which intensity of interference fringes becomes maximum as the target temperature based on the images acquired by the image acquiring unit and the temperature measurement result acquired by the temperature acquiring unit, for each of the images.

3. The three-dimensional shape measuring device according to claim 1, comprising:

a temperature measuring unit configured to measure the temperature of the holder;

an objective lens configured to cause the measurement light to focus on the surface to be measured;

a camera configured to capture an image of the interference light generated by the interfering unit;

a focusing control unit configured to focus the objective lens on the surface to be measured;

a temperature change control unit configured to control the temperature adjusting unit to change the temperature of the holder in a state where the objective lens is focused on the surface to be measured;

an image acquiring unit configured to cause the camera to repeatedly capture the image of the interference light to acquire images from the camera while the temperature change control unit changes the temperature of the holder;

a temperature acquiring unit configured to repeatedly acquire temperature measurement results by the temperature measuring unit while the temperature change control unit changes the temperature of the holder; and a target temperature determining unit configured to determine a temperature at which intensity of interference fringes becomes maximum as the target temperature based on the images acquired by the image acquiring unit and the temperature measurement results acquired by the temperature acquiring unit.

4. The three-dimensional shape measuring device according to claim 1, comprising:

a temperature measuring unit configured to measure the temperature of the holder; and a target temperature control unit configured to control the temperature adjusting unit to adjust the temperature of the holder to the target temperature based on the target temperature and a temperature measurement result of the temperature measuring unit.

5. The three-dimensional shape measuring device according to claim 4, wherein the temperature adjusting unit changes a temperature of a reference surface housing part that houses the reference surface in the holder, and the temperature measuring unit measures the temperature of the reference surface housing part.

6. The three-dimensional shape measuring device according to claim 5, comprising:

a heat insulating material configured to cover at least the reference surface housing part, the temperature measuring unit and the temperature adjusting unit.

7. The three-dimensional shape measuring device according to claim 1, comprising:

an adapter part to which one of a plurality of lens systems respectively including the holder, the temperature adjusting unit and the temperature measuring unit, is selectively attached;

a target temperature storing unit configured to store a correspondence relationship between each of the plurality of lens systems and the target temperature determined for each of the lens systems;

a lens system distinguishing unit configured to distinguish a lens system attached to the adapter part; and a target temperature acquiring unit configured to acquire the target temperature corresponding to the lens system attached to the adapter part from the target temperature storing unit based on a distinguishing result of the lens system distinguishing unit, wherein the target temperature control unit controls the temperature adjusting unit in accordance with the target temperature acquired by the target temperature acquiring unit.

8. The three-dimensional shape measuring device according to claim 1, comprising:

an objective lens configured to cause the measurement light to focus on the surface to be measured, wherein the interfering unit is positioned between the objective lens and the surface to be measured, wherein the reference surface is positioned between the objective lens and the interfering unit.

9. The three-dimensional shape measuring device according to claim 1, comprising:

a camera configured to capture an image of the interference light generated by the interfering unit;

a scanning unit configured to cause at least the interfering unit to scan in a scanning direction in which the measurement light path length changes relatively to the surface to be measured; and a shape calculating unit configured to calculate height information of the surface to be measured for each pixel to obtain the three-dimensional shape of the surface to be measured based on luminance values for each pixel on the same coordinate in images obtained by the camera repeatedly capturing images of the interference light during scanning by the scanning unit.

* * * * *